US012568435B2

(12) United States Patent
Wang et al.

(10) Patent No.: US 12,568,435 B2
(45) Date of Patent: Mar. 3, 2026

(54) SIGNAL TRANSMISSION METHOD, NETWORK DEVICE, USER EQUIPMENT AND STORAGE MEDIUM

(71) Applicant: DATANG MOBILE COMMUNICATIONS EQUIPMENT CO., LTD., Beijing (CN)

(72) Inventors: Jiaqing Wang, Beijing (CN); Meiying Yang, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 418 days.

(21) Appl. No.: 18/249,949

(22) PCT Filed: Oct. 20, 2021

(86) PCT No.: PCT/CN2021/124928
§ 371 (c)(1),
(2) Date: Apr. 20, 2023

(87) PCT Pub. No.: WO2022/083626
PCT Pub. Date: Apr. 28, 2022

(65) Prior Publication Data
US 2023/0397109 A1     Dec. 7, 2023

(30) Foreign Application Priority Data
Oct. 21, 2020     (CN) .......................... 202011135210.3

(51) Int. Cl.
H04W 52/02     (2009.01)
H04W 68/00     (2009.01)
H04W 76/27     (2018.01)

(52) U.S. Cl.
CPC ..... *H04W 52/0229* (2013.01); *H04W 68/005* (2013.01); *H04W 76/27* (2018.02)

(58) Field of Classification Search
CPC ........... H04W 52/0229; H04W 68/005; H04W 76/27
See application file for complete search history.

(56) References Cited

U.S. PATENT DOCUMENTS 10,051,572 B1     8/2018   Govindassamy
2014/0112229 A1*   4/2014   Merlin .................. H04L 5/0055
370/311
(Continued)

FOREIGN PATENT DOCUMENTS

CN     110149694 A     8/2019
CN     111050383 A     4/2020
(Continued)

OTHER PUBLICATIONS

Extended European Search Report for the corresponding European Patent Application No. 21882041.3 issued by the European Patent Office on Mar. 12, 2024.
(Continued)

*Primary Examiner* — Jael M Ulysse
(74) *Attorney, Agent, or Firm* — Ladas & Parry, LLP

(57)     ABSTRACT
A signal transmission method, a network device, a terminal and a storage medium are provided. The signal transmission method includes transmitting, by a network device, a PEI to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

19 Claims, 4 Drawing Sheets

(56) References Cited

U.S. PATENT DOCUMENTS

| | | | |
|---|---|---|---|
| 2020/0229092 A1 | 7/2020 | Wu et al. | |
| 2020/0229135 A1* | 7/2020 | Ozturk | H04W 68/005 |
| 2020/0267585 A1* | 8/2020 | Menon | H04W 24/10 |
| 2020/0383077 A1* | 12/2020 | Zaki | H04W 52/0245 |
| 2021/0127351 A1* | 4/2021 | Stojanovski | H04W 48/16 |
| 2021/0360636 A1 | 11/2021 | Chen | |
| 2022/0046582 A1* | 2/2022 | Shrivastava | H04W 52/0229 |
| 2022/0078710 A1* | 3/2022 | Xu | H04W 72/23 |
| 2023/0043139 A1* | 2/2023 | Hwang | H04W 52/0219 |
| 2023/0209462 A1* | 6/2023 | Tsai | H04W 52/0235 |
| | | | 370/311 |
| 2023/0209464 A1* | 6/2023 | Tsai | H04W 52/0216 |
| | | | 370/311 |

FOREIGN PATENT DOCUMENTS

| | | | |
|---|---|---|---|
| CN | 111050384 A | 4/2020 | |
| CN | 111132280 A | 5/2020 | |
| CN | 111278090 A | 6/2020 | |
| CN | 111278107 A | 6/2020 | |
| CN | 111432460 A | 7/2020 | |
| CN | 111800856 A | 10/2020 | |
| GB | 2568513 A | 5/2019 | |
| WO | 2018175760 A1 | 9/2018 | |
| WO | WO-2020167205 A1 * | 8/2020 | H04W 24/10 |

OTHER PUBLICATIONS

International Search Report for PCT/CN2021/124928 issued on Dec. 29, 2021 and its English Translation provided by WIPO.

Written Opinion for PCT/CN2021/124928 issued on Dec. 29, 2021 and its English Translation provided by WIPO.

International Preliminary Report on Patentibily for PCT/CN2021/124928 issued on Apr. 13, 2023 and its English translation provided by WIPO.

First Chinese Office Action and search report for Chinese Patent Application No. 202011135210.3 issued by the Chinese Patent Office on Jun. 30, 2023 and its English translation provided by applicant's foreign counsel.

"Evaluation methodology and paging enhancements for idle/inactive mode UE power saving," 3GPP TSG RAN WG1 #102-e, R1-2005615, e-Meeting, Aug. 17-28, 2020, Agenda Item: 8.7.1.1, Source: MediaTek Inc., all pages.

"Paging Enhancements for UE Power Saving in NR," 3GPP TSG-RAN WG2 Meeting #111 electronic, R2-2008361, Online, Aug. 17-28, 2020 Revision of R2-2007190, Agenda item: 8.9.2, Source: MediaTek Inc, all pages.

"Status report for WI_UE Power Saving Enhancements" 3GPP Tsg Ran meeting #89e, RP-201701, Electronic Meeting, Sep. 14-18, 2020, Agenda item: 9.8.7 UE power saving enhancements for Nr [RAN2 Wi: NR_UE_pow_sav_enh], all pages.

* cited by examiner

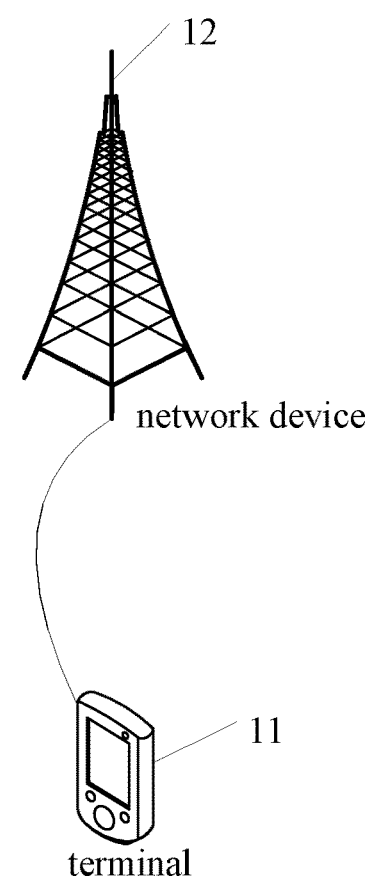
network device
terminal
Fig. 1
transmitting, by a network device, a PEI to a terminal — 201
Fig. 2
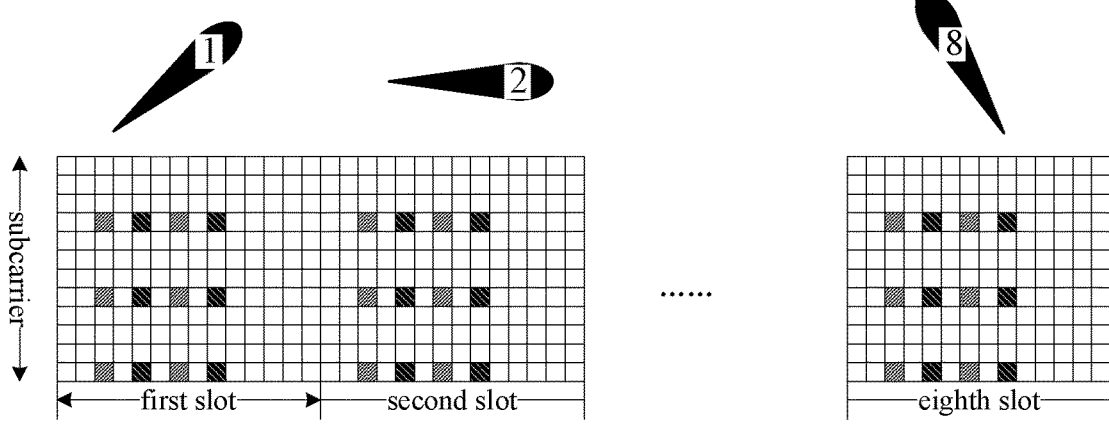
Fig. 3 detecting, by a terminal, a PEI transmitted by a network device —— 601 determining, by the terminal in accordance with the detected PEI, whether paging information is to be detected on a PO —— 602

SIGNAL TRANSMISSION METHOD, NETWORK DEVICE, USER EQUIPMENT AND STORAGE MEDIUM

CROSS-REFERENCE TO RELATED APPLICATIONS

This application is the U.S. national phase of PCT Application No. PCT/CN2021/124928 filed on Oct. 20, 2021, which claims a priority of to the Chinese patent application No. 202011135210.3 filed in China on Oct. 21, 2020, the disclosures of which are incorporated herein by reference in their entireties.

This application claims a priority of the Chinese patent application No. 202011135210.3 filed in China on Oct. 21, 2020, which is incorporated herein by reference in its entirety.

TECHNICAL FIELD

The present disclosure relates to the field of communication technology, in particular to a signal transmission method, a network device, a terminal and a storage medium.

BACKGROUND

In some communication systems (e.g., $5^{th}$-Generation (5G) system), operating modes of a terminal may include an idle mode (RRC IDLE), an inactive mode (RRC Inactive) and a connected state (RRC Connected). However, in these states, the terminal needs to detect paging information on each Paging Occasion (PO), resulting in high power consumption of the terminal.

SUMMARY

An object of the present disclosure is to provide a signal transmission method, a network device, a terminal and a storage medium, so as to reduce the power consumption of the terminal.

In one aspect, the present disclosure provides in some embodiments a signal transmission method, including transmitting, by a network device, a Paging Early Indication (PEI) to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell Identity (ID), scrambling information of the second power-saving signal includes a cell ID and a terminal group ID, and the transmitting, by the network device, the PEI to the terminal includes the network transmitting, on a first resource, the first power-saving signal, or the network device transmitting, on a second resource, the second power-saving signal; or the scrambling information of the first power-saving signal includes the cell ID and includes a first preset sequence or a second preset sequence, the scrambling information of the second power-saving signal includes the cell ID and the terminal group ID, and the transmitting, by the network device, the PEI to the terminal includes the network device transmitting, on the first resource, the first power-saving signal, and/or the network device transmitting, on the second resource, the second power-saving signal.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of a Monitoring Occasion (MO) corresponding to the PEI.

Optionally, the transmitting, by the network device, the PEI to the terminal includes transmitting, by the network device, N PEIs to the terminal through N beams, N being an integer greater than 1.

Optionally, patterns or resources of the power-saving signals included in a first PEI in the N PEIs are configured in a same time unit and have a same Transmission Configuration Indication (TCI) state, and the first PEI is any PEI in the N PEIs.

Optionally, the patterns or resources of the power-saving signals included in the N PEIs are configured in N time units respectively, and the PEIs in different time units are transmitted through different beams.

Optionally, the patterns or resources of at least one power-saving signal included in a same PEI are configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; or the supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by the network device to the terminal through high-layer signaling.

Optionally, in the case that the PEI includes the first power-saving signal and the second power-saving signal, the first power-saving signal is a cell-specific power-saving signal, and the second power-saving signal is a group common Physical Downlink Control Channel (PDCCH).

Optionally, in the case that a paging message is to be transmitted on the PO, the scrambling information of the first power-saving signal includes a fifth preset sequence, and in the case that no paging message is to be transmitted on the PO, the scrambling information of the first power-saving signal includes a sixth preset sequence.

Optionally, the transmitting, by the network device, the PEI to the terminal includes: in the case that there is a power-saving signal for a terminal in a connected state before the PO, deactivating, by the network device, a first resource for the first power-saving signal, and transmitting the second power-saving signal to the terminal on a second resource; or in the case that there is no power-saving signal for the terminal in the connected state before the PO, the network device transmitting, on the first resource, the first power-saving signal to the terminal, and the network device transmitting, on the second resource, the second power-saving signal to the terminal.

Optionally, the first power-saving signal includes one of a Tracking Reference Signal (TRS) or a Channel State Information Reference Signal (CSI-RS); and/or the second power-saving signal includes one of a TRS or a CSI-RS.

In another aspect, the present disclosure provides in some embodiments a signal transmission method, including: detecting, by a terminal, a PEI transmitted by a network device, the terminal being in an idle mode or an inactive mode, the PEI including at least one of a first power-saving signal or a second power-saving signal; and determining, by the terminal in accordance with the detected PEI, whether paging information is to be detected on a PO. The PEI is transmitted before the PO, and the PO includes at least one PO or at least one PO group.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell ID, scrambling information of the second power-saving signal includes a cell ID and a terminal group ID, and the detecting, by the terminal, the PEI transmitted by the network device includes: detecting, by the terminal, the first power-saving signal on a first resource or detecting the second power-saving signal on a second resource, or detecting, by the terminal, the first power-saving signal and the second power-saving signal on the first resource and the second resource respectively; or the scrambling information of the first power-saving signal includes the cell ID and includes a first preset sequence or a second preset sequence, the scrambling information of the second power-saving signal includes the cell ID and the terminal group ID, and the detecting, by the terminal, the PEI transmitted by the network device includes detecting the first power-saving signal on the first resource, and in the case that the second preset sequence and the first power-saving signal scrambled with the cell ID are detected on the first resource, detecting, by the terminal, the second power-saving signal on the second resource. In the case that the first preset sequence and the first power-saving signal scrambled with the cell ID have been detected on the first resource, the terminal determines whether the paging information is to be detected on the PO in accordance with the first power-saving signal and does not detect the second power-saving signal. In the case that the second power-saving signal has been detected on the second resource, the terminal determines whether the paging information is to be detected on the PO in accordance with the second power-saving signal, and in the case that the second power-saving signal fails to be detected on the second resource, the terminal enters a sleep state.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of an MO corresponding to the PEI.

Optionally, patterns or resources of the power-saving signals included in the PEI are configured in a same time unit and have a same TCI state.

Optionally, the pattern or resource of at least one power-saving signal included in the PEI is configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by a network device to the terminal through high-layer signaling.

Optionally, in the case that the first power-saving signal is used for the synchronization and the second power-saving signal is used for the paging indication, the detecting, by the terminal, the PEI transmitted by the network device includes: receiving, by the terminal, the first power-saving signal in accordance with an indication from the network device, and performing a channel tracking operation in accordance with the first power-saving signal; detecting, by the terminal, the second power-saving signal; and in the case that the second power-saving signal is detected by the terminal, determining, by the terminal, whether the paging information is to be detected on the PO in accordance with the second power-saving signal.

Optionally, in the case that the first power-saving signal supports paging indication and the second power-saving signal supports paging indication, the detecting, by the terminal, the PEI transmitted by the network device includes: detecting, by the terminal, the first power-saving signal scrambled with a third scrambling sequence; in the case that the first power-saving signal scrambled with the third scrambling sequence fails to be detected, detecting, by the terminal, the first power-saving signal scrambled with a fourth scrambling sequence; and in the case that the first power-saving signal scrambled with the third scrambling sequence has been detected or the first power-saving signal scrambled with the third scrambling sequence and the first power-saving signal scrambled with the fourth scrambling sequence fail to be detected, detecting, by the terminal, the second power-saving signal. In the case that the first power-saving signal scrambled with the fourth scrambling sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, in the case that the PEI includes the first power-saving signal and the second power-saving signal, the first power-saving signal is a cell-specific power-saving signal and the second power-saving signal is a group common PDDCH.

Optionally, the detecting, by the terminal, the PEI transmitted by the network device includes: detecting, by the terminal, the first power-saving signal scrambled with a fifth preset sequence; in the case that the first power-saving signal scrambled with the fifth preset sequence fails to be detected, detecting, by the terminal, the first power-saving signal scrambled with a sixth preset sequence; and in the case that the first power-saving signal scrambled with the fifth preset sequence has been detected or the first power-saving signal scrambled with the fifth preset sequence and the first power-saving signal scrambled with the sixth preset sequence fail to be detected, detecting, by the terminal, the second power-saving signal. In the case that the first power-saving signal scrambled with the sixth preset sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, the first power-saving signal includes one of a TRS or a CSI-RS, and/or the second power-saving signal includes one of a TRS or a CSI-RS.

In yet another aspect, the present disclosure provides in some embodiments a network device, including a memory, a transceiver and a processor. The memory is configured to store therein a computer program. The transceiver is configured to receive and transmit data under the control of the processor. The processor is configured to read the computer program in the memory, so as to transmit a PEI to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

Optionally, the first power-saving signal is used for paging indication, and the first power-saving signal is a cell-specific power-saving signal, the second power-saving signal is used for paging indication, the second power-saving signal is a terminal group-specific power-saving signal; or the first power-saving signal is used for paging indication and the first power-saving signal is a terminal group-specific power-saving signal, and/or the second power-saving signal is used for paging indication and the second power-saving signal is a terminal group-specific power-saving signal; or the first power-saving signal is used for synchronization, the second power-saving signal is used for paging indication, and scrambling information of the second power-saving signal includes a cell ID and a terminal group ID; or the supports paging indication, scrambling information of the first power-saving signal includes a third preset sequence or a fourth preset sequence, and the scrambling information of the second power-saving signal includes a cell ID and a terminal group ID.

In still yet another aspect, the present disclosure provides in some embodiments a terminal, including a memory, a transceiver and a processor. The memory is configured to store therein a computer program. The transceiver is configured to receive and transmit data under the control of the processor. The processor is configured to read the computer program in the memory, so as to: detect a PEI transmitted by a network device, the terminal being in an idle mode or an inactive mode, the PEI including at least one of a first power-saving signal or a second power-saving signal; and determine whether paging information is to be detected on PO in accordance with the detected PEI. The PEI is transmitted before the PO, and the PO includes at least one PO or at least one PO group.

Optionally, the first power-saving signal is used for paging indication, and the first power-saving signal is a cell-specific power-saving signal, the second power-saving signal is used for paging indication, the second power-saving signal is a terminal group-specific power-saving signal; or the first power-saving signal is used for paging indication and the first power-saving signal is a terminal group-specific power-saving signal, and/or the second power-saving signal is used for paging indication and the second power-saving signal is a terminal group-specific power-saving signal; or the first power-saving signal is used for synchronization, the second power-saving signal is used for paging indication, and scrambling information of the second power-saving signal includes a cell ID and a terminal group ID; or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

In still yet another aspect, the present disclosure provides in some embodiments a network device, including a transmission unit configured to transmit a PEI to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

In still yet another aspect, the present disclosure provides in some embodiments a terminal, including: a detection unit configured to detect a PEI transmitted by a network device, the terminal being in an idle mode or an inactive mode, the PEI including at least one of a first power-saving signal or a second power-saving signal; and a determination unit configured to determine whether paging information is to be detected on PO in accordance with the detected PEI. The PEI is transmitted before the PO, and the PO includes at least one PO or at least one PO group.

In still yet another aspect, the present disclosure provides in some embodiments a processor-readable storage medium storing therein a computer program. The computer program is executed by a processor so as to implement the signal transmission method at a network device side or the signal transmission method at a terminal side.

According to the embodiments of the present disclosure, the network device transmits the PEI to the terminal in the idle mode or the inactive mode. The PEI includes at least one of the first power-saving signal or the second power-saving signal, the PEI is used to indicate whether the terminal is to detect paging information on PO, the PEI is transmitted before the PO, and the PO includes at least one PO or at least one PO group. As a result, it is able for the terminal to determine whether to detect the paging information on the PO, and prevent the terminal from detecting the paging information on each PO, thereby to reduce the power consumption of the terminal.

BRIEF DESCRIPTION OF THE DRAWINGS

FIG. 1 is a schematic view showing applicable network architecture according to an embodiment of the present disclosure;

FIG. 2 is a flow chart of a signal transmission method according to an embodiment of the present disclosure;

FIG. 3 is a schematic view showing the transmission of a power-saving signal according to an embodiment of the present disclosure;

DETAILED DESCRIPTION

Figure 4:
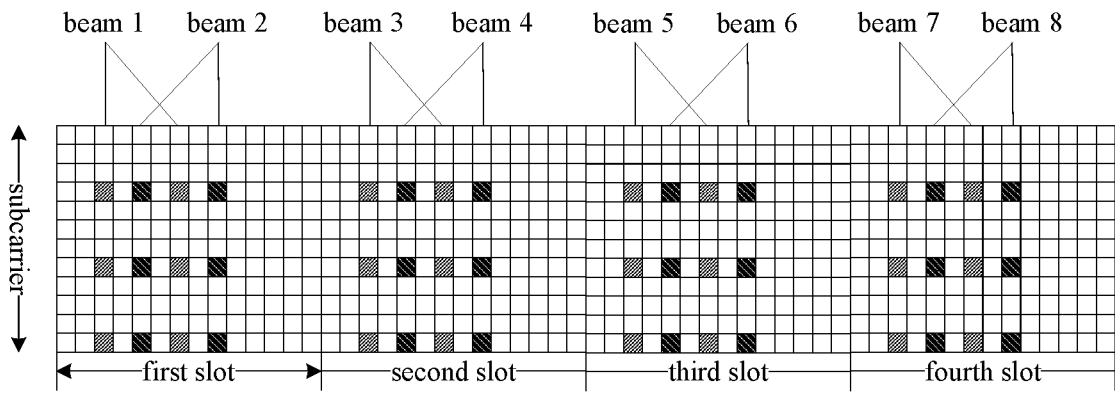
FIG. 4 is another schematic view showing the transmission of the power-saving signal according to an embodiment of the present disclosure.

In order to make the objects, the technical solutions and the advantages of the present disclosure more apparent, the present disclosure will be described hereinafter in conjunction with the drawings and embodiments.

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a signal transmission method, a network device, a terminal and a storage medium, so as to reduce the power consumption of the terminal.

The method and the device are provided on the basis of a same inventive concept, and a principle of the method for solving the problem is similar to that of the device, so the implementation of the device may refer to that of the method, and the repeated contents will not be provided.

Schemes in the embodiments of the present disclosure may be applied to various systems (especially the 5G system), e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, 5th-Generation (5G) New Radio (NR) system, or 6th-Generation (6G) system. Each of these systems includes a terminal device and a network device. Each system further includes a core network part, e.g., an Evolved Packet System (EPS) or 5G system (5GS).

FIG. 1 shows applicable network architecture according to an embodiment of the present disclosure. As shown in FIG. 1, the network architecture includes a terminal 11 and a network device 12.

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO transmission is performed between the network device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

As shown in FIG. 2, the present disclosure provides in some embodiments a signal transmission method, which includes Step 201 of transmitting, by a network device, a PEI to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

When the terminal is in the idle mode or inactive mode, the terminal may be in a Radio Resource Control (RRC) idle mode or RRC inactive mode.

The PO group includes one or more PO. One PO may include a group of MOs, and especially the one PO may include a plurality of slots, sub-frames or Orthogonal Frequency Division Multiplexing (OFDM) symbols. In addition, the paging information is transmitted on a PDCCH MO.

In the embodiments of the present disclosure, the paging information is also called as paging message, e.g., paging Downlink Control Information (DCI).

When the PEI is transmitted before the PO, it means that the PEI is transmitted on one or more time-domain resources, e.g., slots, sub-slots or symbols, before the PO.

The first power-saving signal and the second power-saving signal are of a same type or different types. Optionally, the first power-saving signal includes one of a TRS or a CSI-RS, and the second power-saving signal includes one of a TRS or a CSI-RS. It should be noted that, the first power-saving signal and the second power-saving signal are not limited thereto. For example, the first power-saving signal may be a PDCCH signal, and the second power-saving signal may be a PDCCH signal too.

According to the embodiments of the present disclosure, through the above-mentioned step, the network device transmits the PEI to the terminal in the idle mode or the inactive mode before one PO or one PO group, and the PEI corresponds to the one PO or one PO group. As a result, it is able for the terminal to determine whether the paging information is to be detected on the corresponding PO in accordance with the PEI, thereby to reduce the power consumption of the terminal.

Optionally, the first power-saving signal is used for paging indication, and the first power-saving signal is a cell-specific power-saving signal. The second power-saving signal is used for paging indication, and the second power-saving signal is a terminal group-specific power-saving signal.

The first power-saving signal may be scrambled with a cell ID, and the second power-saving signal may be scrambled with a cell ID and a terminal group ID.

In the embodiments of the present disclosure, the network device may notify the terminal of the quantity M of terminal groups through System Information (SI) in a broadcasting manner, where M is an integer greater than or equal to 1. The terminal may determine the terminal group ID in accordance with a terminal ID and the quantity of the terminal groups.

Optionally, scrambling information of the first power-saving signal includes a cell ID, scrambling information of the second power-saving signal includes a cell ID and a terminal group ID, and the transmitting, by the network device, the PEI to the terminal includes the network transmitting, on a first resource, the first power-saving signal, or the network device transmitting, on a second resource, the second power-saving signal.

When the network device transmits the first power-saving signal on the first resource or transmits the second power-saving signal on the second resource, it may mean that the network device transmits the first power-saving signal merely on the first resource or transmits the second power-saving signal merely on the second resource; or the network device supports to transmit the first power-saving signal and the second power-saving signal; in particular, the network device may transmit the first power-saving signal on the first resource or transmit the second power-saving signal on the second resource; it should be noted that, the network device may also transmit the first power-saving signal on the first resource and transmit the second power-saving signal on the second resource.

For example, the network device transmits the first power-saving signal merely on the first resource or transmits the second power-saving signal merely on the second resource each time. The terminal detects the first power-saving signal at first, and detects the second power-saving signal in the case that the first power-saving signal fails to be detected. When the first power-saving signal has been detected, the terminal does not continue to detect the second power-saving signal, and it determines whether to detect the paging information in accordance with the first power-saving signal. When the paging information is to be detected, a receiver is waken up to receive the paging information subsequently. When the second power-saving signal has been detected, the terminal determines whether to detect the paging information in accordance with only the second power-saving signal. When the paging information is to be detected, the received is waken up to receive the paging information subsequently.

Optionally, the scrambling information of the first power-saving signal includes a cell ID and includes a first preset sequence or a second preset sequence, and the scrambling information of the second power-saving signal includes a cell ID and a terminal group ID.

The first preset sequence or the second preset sequence may be configured by the network device, or agreed in a protocol. For example, the first preset sequence is a0= [0 0 0 . . . 0], and the second preset sequence is a1=[1 0 1 0 1 0, . . . 1 0, . . . ].

When the first power-saving signal is scrambled with the first preset sequence, it means that whether to detect the paging information is directly indicated through the first power-saving signal and the second power-saving signal is not transmitted. When the first power-saving signal is scrambled with the second preset sequence, it means that the second power-saving signal is transmitted and whether to detect the paging information is directly indicated through the second power-saving signal. Preferably, the first preset sequence is different from the second preset sequence. It should be noted that, the first preset sequence may alternatively be the same as the second preset sequence.

The transmitting, by the network device, the PEI to the terminal includes transmitting, by the network device, the first power-saving signal on the first resource, and/or transmitting the second power-saving signal on the second resource.

The transmitting, by the network device, the first power-saving signal on the first resource and/or transmitting the second power-saving signal on the second resource includes: transmitting, by the network device, the first power-saving signal on the first resource and transmitting the second power-saving signal on the second resource; or transmitting, by the network device, the first power-saving signal on the first resource, or transmitting the second power-saving signal on the second resource.

For example, the network device transmits the first power-saving signal on the first resource and/or transmits the second power-saving signal on the second resource. When the first power-saving signal scrambled with the first preset sequence and the cell ID has been detected by the terminal, the terminal wakes up the receiver to receive the paging information, and does not detect the second power-saving signal. When the first power-saving signal scrambled with the second preset sequence and the cell ID has been detected by the terminal, the terminal continues to detect the second power-saving signal scrambled with the cell ID and the terminal group ID on the second resource. When the second power-saving signal has been detected by the terminal on the second resource, the terminal wakes up the receiver to receive the subsequent paging information. When the second power-saving signal fails to be detected by the terminal, the terminal continues to be in the sleep state. When the first power-saving signal fails to be detected by the terminal, the terminal does not detect the second power-saving signal.

Optionally, the first resource and the second resource are within a same time unit.

The time unit is a slot, a sub-slot or a symbol. When the first resource and the second resource are in the same time unit, it means that the first resource and the second resource are within a same time period.

In the embodiments of the present disclosure, the first resource may be a resource for transmitting the first power-saving signal, and the second resource may be a resource for transmitting the second power-saving signal. The first resource and the second resource may be preconfigured by the network device, or agreed in a protocol, which will not be particularly defined herein.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

In the embodiments of the present disclosure, the first power-saving signal and the second power-saving signal may be both terminal group-specific power-saving signals, or one of the first power-saving signal or the second power-saving signal may be the terminal group-specific power-saving signal.

Optionally, scrambling information of the first power-saving signal includes a cell ID and a terminal group ID, and/or scrambling information of the second power-saving signal includes a cell ID and a terminal group ID.

For example, one of the first power-saving signal or the second power-saving signal is scrambled with the cell ID and the terminal group ID.

The scrambling information of the first power-saving signal further includes at least one of time information about paging or index information about the first power-saving signal, and/or the scrambling information of the second power-saving signal further includes at least one of time information about paging and index information about the second power-saving signal.

The time information about paging may be information about a time for transmitting the paging information.

For example, the time information about paging includes at least one of information about a start symbol of the PO, or information about a start time of an MO corresponding to the PEI.

The information about the start time of the MO may include at least one of a start slot information of the MO or a start OFDM symbol information of the MO.

In the embodiments of the present disclosure, due to the time information about paging, the terminal may directly receive the paging on a time-domain resource corresponding to the time information, so it is able to further reduce the power consumption of the terminal. In addition, due to the index information about the power-saving signal being included, it is able to determine the specific power-saving signal in accordance with the index information, without any necessity for the terminal to differentiate the first power-saving signal from the second power-saving signal in accordance with the other information, thereby to reduce a signaling overhead.

Optionally, the transmitting, by the network device, the PEI to the terminal includes transmitting, by the network device, N PEIs to the terminal through N beams, N being an integer greater than 1.

When the N PEIs are transmitted to the terminal through the N beams, the N PEIs may be transmitted through the N beams respectively, i.e., different PEIs are transmitted through different beams.

When the N PEIs are transmitted to the terminal through the N beams, it is able to improve the coverage of the PEIs. In addition, a part of or all of the N PEIs may be the same or different.

Optionally, patterns or resources of the power-saving signals included in a first PEI in the N PEIs are configured in a same time unit and have a same TCI state, and the first PEI is any PEI in the N PEIs.

When the patterns of the power-saving signals in the first PEI are configured in a same time unit, it means that all the power-saving signals in the first PEI are transmitted in a same time unit. When the resources of the power-saving signals included in the first PEI are configured in a same time unit, it means that all the power-saving signals in the first PEIs are transmitted in a same time unit. In addition, the pattern of the power-saving signal may be a pattern of the power-saving signal mapped onto a time-domain resource, e.g., a pattern of the time unit where the power-saving signal is transmitted onto the time-domain resource.

In the embodiments of the present disclosure, the power-saving signals included in a same PEI are transmitted in a same time unit and have a same TCI, so it is able to reduce the time-domain resources for transmitting the PEI. In addition, the time unit is a slot or sub-lot.

Optionally, the patterns or resources of the power-saving signals included in the N PEIs are configured in N time units respectively, and the PEIs in different time units are transmitted through different beams.

In the embodiments of the present disclosure, it is able to transmit different PEIs in different time units and through different beams.

Optionally, the pattern or resource of at least one power-saving signal included in a same PEI is configured in a same time unit, and the power-saving signals included in different PEIs are configured in different time units.

For example, each PEI includes two power-saving signals. As shown in FIG. 3, eight PEIs are transmitted within eight slots respectively, and each PEI includes two power-saving signals, i.e., two different time units filled with different patterns in each slot in FIG. 3.

Since the pattern or resource of at least one power-saving signal included in a same PEI is configured in a same time unit, it is able to reduce a time for transmitting the PEI.

Optionally, in the case that one PEI includes a plurality of power-saving signals, the plurality of power-saving signals is transmitted through different beams, and different beams are used for different PEIs. For example, as shown in FIG. 4, one PEI includes two power-saving signals transmitted through two beams respectively, e.g., the two power-saving signals in the PEI within a first slot are transmitted through two beams respectively, so it is able to improve the coverage of the PEI. In addition, the plurality of power-saving signals included in a same PEI may be the same, i.e., the PEI may be transmitted repeatedly through different beams. It should be noted that, the plurality of power-saving signals included in a same PEI may also be different, which will not be particularly defined herein.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

In the embodiments of the present disclosure, when one or more PEIs are configured in one time unit, different PEIs in a same time unit are transmitted through different beams and the power-saving signals included in a same PEI are transmitted through a same beam, it is able to further reduce the time for transmitting the PEI.

Optionally, the first power-saving signal and the second power-saving signal included in a same PEI in the one time unit are configured in a same time sub-unit, or different time sub-units, of the one time unit.

Figure 5:
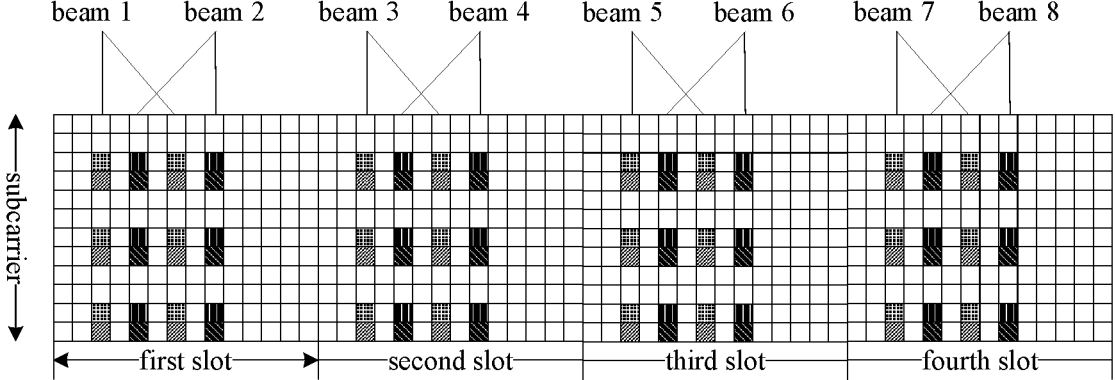
FIG. 5 is yet another schematic view showing the transmission of the power-saving signal according to an embodiment of the present disclosure.

For example, as shown in FIG. 5, two PEIs are transmitted within a same slot, different PEIs are transmitted through different beams, and the two power-saving signals included in a same PEI are transmitted through a same beam and a same symbol. When the power-saving signals occupy a same time sub-unit, it is able to further reduce the time for transmitting the PEI.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

In the embodiments of the present disclosure, the first power-saving signal is a terminal-specific reference signal or a cell-specific reference signal implicitly scrambled with the cell ID, and the second power-saving signal is the terminal group-specific signal.

When the first power-saving signal is used for synchronization, it is able to assist the terminal to detect the paging indication for the second power-saving signal, thereby to reduce the complexity in the detection of the paging indication. For example, the terminal does not perform blind detection on the first power-saving signal, and instead it performs a channel tracking operation using the first power-saving signal. The terminal detects the second power-saving signal on a corresponding resource. When the second power-saving signal has been detected or a wake-up indication for the second power-saving signal has been detected by the terminal, the terminal determines whether to detect the paging information on the PO in accordance with the second power-saving signal.

When the first power-saving signal supports paging indication and the second power-saving signal supports paging indication, it means that the first power-saving signal is capable of being used for paging indication, and the second power-saving signal is also capable of being used for paging indication. However, in actual use, the first power-saving signal may indicate or may not indicate paging indication, and so does the second power-saving signal. The third scrambling sequence is different from the fourth scrambling sequence. It should be noted that, in some particular circumstances, the third scrambling sequence may be the same as the fourth scrambling sequence.

For example, the terminal detects the first power-saving signal scrambled with the third preset sequence at first. When the first power-saving signal scrambled with the third preset sequence fails to be detected by the terminal, the terminal continues to detect the first power-saving signal scrambled with the fourth preset sequence. When the first power-saving signal scrambled with the third preset sequence has been detected by the terminal, the terminal continues to detect the second power-saving signal, and determines whether to wake up the receiver to receive the paging information in accordance with whether the second power-saving signal has been detected. When the first power-saving signal scrambled with the fourth preset sequence has been detected by the terminal, the terminal stops detecting the second power-saving signal, and enters the sleep state. When the first power-saving signal scrambled with the third scrambling sequence and the first power-saving signal scrambled with the fourth scrambling sequence fail to be detected by the terminal, the terminal continues to detect the second power-saving signal, and determines whether to receive the paging information subsequently on a corresponding PO in accordance with the second power-saving signal.

In the embodiments of the present disclosure, through the fourth preset sequence, the terminal may enter the sleep state rapidly, so as to reduce the power consumption of the terminal. For example, in the case that there is no paging information to be transmitted on the PO, the scrambling information of the first power-saving signal includes the fourth preset sequence.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by the network device to the terminal through high-layer signaling.

In the embodiments of the present disclosure, the power-saving signal configured to the terminal in the connected state is transmitted to the terminal in the idle mode or inactive mode, so as to reduce the power consumption of the network device. This is because, it is unnecessary to configure any additional power-saving signal for the terminal in the idle mode or inactive mode. In addition, the first power-saving signal includes or does not include a reference signal configured for the terminal in the idle mode or inactive mode.

It should be noted that, in the case that the first power-saving signal supports paging indication and the second power-saving signal supports paging indication, the first power-saving signal may also be a reference signal configured for the terminal in the connected state and transmitted to the terminal in the idle mode or inactive mode.

When the scrambling information of the first power-saving signal is notified by the network device to the terminal through high-layer signaling, it means that the network device notifies the terminal in the idle mode or inactive mode of the scrambling information through high-layer signaling (e.g., broadcast signaling). In addition, the scrambling information of the first power-saving signal may be the terminal-specific ID. For example, the network device configures the terminal-specific ID for the terminal in the connected sate, and notifies it to the terminal in the idle mode or inactive mode through broadcast signaling.

Optionally, in the case that the PEI includes the first power-saving signal and the second power-saving signal, the first power-saving signal is a cell-specific power-saving signal, and the second power-saving signal is a group common PDCCH.

In the embodiments of the present disclosure, the scrambling information of the first power-saving signal at least includes the cell ID, and the second power-saving signal is scrambled with a Power Saving Radio Network Temporary identifier (PS-RNTI) or a PEI Radio Network Temporary identifier (PEI-RNTI).

Optionally, in the case that a paging message is to be transmitted on the PO, the scrambling information of the first power-saving signal includes a fifth preset sequence, and in the case that no paging message is to be transmitted on the PO, the scrambling information of the first power-saving signal includes a sixth preset sequence.

In the embodiments of the present disclosure, through the fifth preset sequence and the sixth preset sequence, it is able to further reduce the power consumption of the terminal. For example, the terminal detects the first power-saving signal scrambled with the fifth preset sequence at first. Then the first power-saving signal scrambled with the fifth preset sequence fails to be detected, the terminal continues to detect the first power-saving signal scrambled with the sixth preset sequence. When the first power-saving signal scrambled with the fifth preset sequence has been detected, the terminal continues to detect the second power-saving signal, and determines whether to wake up the receiver to receive the paging information on a corresponding PO in accordance with whether the second power-saving signal has been detected or in accordance with indication signaling of the second power-saving signal. When the first power-saving signal scrambled with the sixth preset sequence is detected by the terminal, the terminal stops detecting the second power-saving signal, and enters the sleep state.

The fifth preset sequence may be different from the sixth preset sequence. It should be noted that, in some particular circumstances, the fifth preset sequence may be same as the sixth preset sequence.

Optionally, the transmitting, by the network device, the PEI to the terminal includes: in the case that there is a power-saving signal for a terminal in a connected state before the PO, deactivating, by the network device, a first resource for the first power-saving signal, and transmitting the second power-saving signal to the terminal on a second resource; or in the case that there is no power-saving signal for the terminal in the connected state before the PO, the network device transmitting, on the first resource, the first power-saving signal to the terminal, and the network device transmitting, on the second resource, the second power-saving signal to the terminal.

The power-saving signal for the terminal in the connected state may be transmitted before the PO within a predetermined range. In the embodiments of the present disclosure, it is able to transmit the corresponding power-saving signal by the network device in accordance wither whether there is the power-saving signal for the terminal in the connected state before the PO, thereby to reduce an overhead of the network device.

According to the embodiments of the present disclosure, the network device transmits the PEI to the terminal in the idle mode or the inactive mode. The PEI includes at least one of the first power-saving signal or the second power-saving signal, the PEI is used to indicate whether the terminal is to detect paging information on PO, the PEI is transmitted before the PO, and the PO includes at least one PO or at least one PO group. As a result, it is able for the terminal to determine whether to detect the paging information on the PO, and prevent the terminal from detecting the paging information on each PO, thereby to reduce the power consumption of the terminal.

Figure 6:
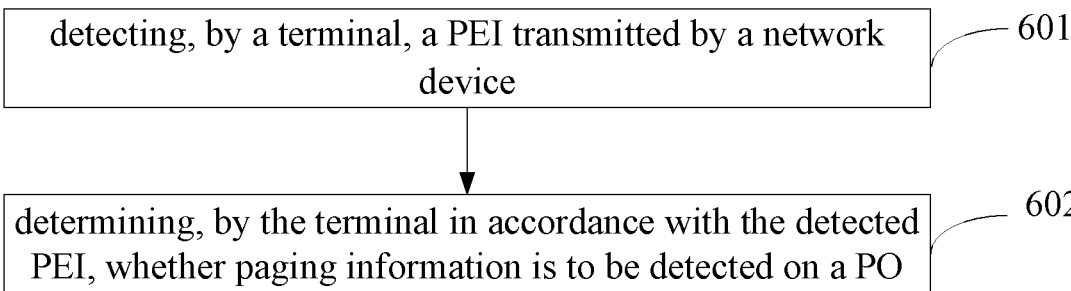
FIG. 6 is a flow chart of another signal transmission method according to an embodiment of the present disclosure.

As shown in FIG. 6, the present disclosure further provides in some embodiments a signal transmission method which includes: Step 601 of detecting, by a terminal, a PEI transmitted by a network device, the terminal being in an idle mode or an inactive mode, the PEI including at least one of a first power-saving signal or a second power-saving signal; and Step 602 of determining, by the terminal in accordance with the detected PEI, whether paging information is to be detected on a PO. The PEI is transmitted before the PO, and the PO includes at least one PO or at least one PO group.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell ID, scrambling information of the second power-saving signal includes a cell ID and a terminal group ID, and the detecting, by the terminal, the PEI transmitted by the network device includes: detecting, by the terminal, the first power-saving signal on a first resource or detecting the second power-saving signal on a second resource, or detecting, by the terminal, the first power-saving signal and the second power-saving signal on the first resource and the second resource respectively; or the scrambling information of the first power-saving signal includes the cell ID and includes a first preset sequence or a second preset sequence, the scrambling information of the second power-saving signal includes the cell ID and the terminal group ID, and the detecting, by the terminal, the PEI transmitted by the network device includes detecting the first power-saving signal on the first resource, and in the case that the second preset sequence and the first power-saving signal scrambled with the cell ID are detected on the first resource, detecting, by the terminal, the second power-saving signal on the second resource. In the case that the first preset sequence and the first power-saving signal scrambled with the cell ID have been detected on the first resource, the terminal determines whether the paging information is to be detected on the PO in accordance with the first power-saving signal and does not detect the second power-saving signal. In the case that the second power-saving signal has been detected on the second resource, the terminal determines whether the paging information is to be detected on the PO in accordance with the second power-saving signal, and in the case that the second power-saving signal fails to be detected on the second resource, the terminal enters a sleep state.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of an MO corresponding to the PEI.

Optionally, patterns or resources of the power-saving signals included in the PEI are configured in a same time unit and have a same TCI state.

Optionally, the pattern or resource of at least one power-saving signal included in the PEI is configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by a network device to the terminal through high-layer signaling.

Optionally, in the case that the first power-saving signal is used for the synchronization and the second power-saving signal is used for the paging indication, the detecting, by the terminal, the PEI transmitted by the network device includes: receiving, by the terminal, the first power-saving signal in accordance with an indication from the network device, and performing a channel tracking operation in accordance with the first power-saving signal; detecting, by the terminal, the second power-saving signal; and in the case that the second power-saving signal is detected by the terminal, determining, by the terminal, whether the paging information is to be detected on the PO in accordance with the second power-saving signal.

Optionally, in the case that the first power-saving signal supports paging indication and the second power-saving signal supports paging indication, the detecting, by the terminal, the PEI transmitted by the network device includes: detecting, by the terminal, the first power-saving signal scrambled with a third scrambling sequence; in the case that the first power-saving signal scrambled with the third scrambling sequence fails to be detected, detecting, by the terminal, the first power-saving signal scrambled with a fourth scrambling sequence; and in the case that the first power-saving signal scrambled with the third scrambling sequence has been detected or the first power-saving signal scrambled with the third scrambling sequence and the first power-saving signal scrambled with the fourth scrambling sequence fail to be detected, detecting, by the terminal, the second power-saving signal. In the case that the first power-saving signal scrambled with the fourth scrambling sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, in the case that the PEI includes the first power-saving signal and the second power-saving signal, the first power-saving signal is a cell-specific power-saving signal and the second power-saving signal is a group common PDDCH.

Optionally, the detecting, by the terminal, the PEI transmitted by the network device includes: detecting, by the terminal, the first power-saving signal scrambled with a fifth preset sequence; in the case that the first power-saving signal scrambled with the fifth preset sequence fails to be detected, detecting, by the terminal, the first power-saving signal scrambled with a sixth preset sequence; and in the case that the first power-saving signal scrambled with the fifth preset sequence has been detected or the first power-saving signal scrambled with the fifth preset sequence and the first power-saving signal scrambled with the sixth preset sequence fail to be detected, detecting, by the terminal, the second power-saving signal. In the case that the first power-saving signal scrambled with the sixth preset sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, the first power-saving signal includes one of a TRS or a CSI-RS, and/or the second power-saving signal includes one of a TRS or a CSI-RS.

Optionally, the detecting, by the terminal, the PEI transmitted by the network device includes performing, by the terminal, serially-concatenated detection on information carried in at least one of the first power-saving signal or the second power-saving signal to obtain the PEI.

For example, the terminal performs serially-concatenated joint detection on the information carried in a plurality of symbols of one or two power-saving signals in an agreed order, so as to obtain the PEI.

It should be appreciated that, the method in the embodiments of the present disclosure corresponds to the method in FIG. 2, and the implementation of the method may refer to that in FIG. 2 with a same beneficial effect, which will not be repeatedly defined herein.

The method in the embodiments of the present disclosure will be described hereinafter in conjunction with specific embodiments when the network device is a base station.

First Embodiment

The base station transmits a power-saving signal for the PEI before a PO or a PO group to the terminal in an RRC idle mode or an inactive mode, and the PEI corresponds to one PO or one PO group. The PEI includes a first TRS/CSI-RS and a second TRS/CSI-RS, and the first TRS/CSI-RS and the second TRS/CSI-RS are both used for paging indication. One TRS may occupy at least one slot, and two CSI-RSs are spaced apart from each other by four OFDM symbols. However, the quantity of slots occupied by the TRS is not particularly limited, and the TRS may occupy a plurality of slots. In general, any CSI-RS having a channel tracking function may be used as the power-saving signal in the embodiments of the present disclosure.

The terminal receives the paging indication consisting of the first TRS and/or the second TRS, and determines whether to receive a paging signal on subsequent one PO or one PO group in accordance with a predetermined rule. An advantage mainly lies in that there is no Long Term Evolution (LTE)-Common Reference Signal (CRS) in the RRL idle mode or inactive mode. Usually, it takes three Synchronization Signal Block (SSB) periods, i.e., 60 ms, to obtain accurate synchronization information at a low signal-to-noise ratio, resulting in large power consumption of the terminal, especially in a scenario where no paging signal is to be received. Through the TRS/CSI-RS-based paging indication signal, on one hand, strict synchronization is not required, so it is able to reduce the power consumption generated for receiving the paging indication. On the other hand, after the paging indication has been received, the TRS/CSI-RS is used to perform channel tracking, so as to facilitate the reception of the paging message. More specifically, the first TRS is a cell-specific TRS, the second TRS is a terminal group-specific TRS; and in some special cases, one terminal group may merely include one UE. Preferably, the first TRS/CSI-RS is scrambled with a cell ID, and the second TRS/CSI-RS is scrambled with a cell ID and a terminal group ID, so as to differentiate the terminals from each other and prevent the occurrence of inter-cell interference. Preferably, the terminal group ID is configured by the base station through broadcasting and/or determines in accordance with a predetermined rule in a standard. Preferably, the base station may notify the terminal of the quantity M of terminal groups through SI in a broadcasting manner, and the terminal determines a grouping rule in accordance with the UEID and the quantity of terminal groups, e.g., group ID=mod(UEID, M). Usually, in the above-mentioned scrambling process, an initial value of a TRS/CSI-RS sequence is a function of a scrambling code ID, or the initial value is obtained through performing a multiplication or addition operation on a function of a target sequence and the scrambling code ID. All terminals in the RRC idle sate or inactive mode and associated with the PO in a current cell may detect the first TRS/CSI-RS and/or the second TRS/CSI-RS on a corresponding resource before the PO. Preferably, the first TRS/CSI-RS and the second TRS/CSI-RS correspond to different transmission resources, so as to reduce the probability of erroneous detection of the first TRS/CSI-RS and the second TRS/CSI-RS. The base station notifies the terminal of the quantity of slots occupied by the first TRS/CSI-RS and/or the second TRS/CSI-RS through broadcasting signaling or in a mode pre-agreed in a standard, and the quantity of slots may be 1, 2 or any other value. In the following embodiments, the quantity of slots occupied by the TRS/CSI-RS for the paging indication or assisting the paging indication may be notified through a same method, which will not be repeatedly defined herein.

First Scheme: the base station transmits the first TRS/CSI-RS merely on a first TRS/CSI-RS resource or transmits the second TRS/CSI-RS merely on a second TRS/CSI-RS resource each time. Preferably, the first TRS resource and the second TRS resource are configured within a same first target time period, e.g., the first TRS resource and the second TRS resource are configured within one or several identical slots. Preferably, the first target time period is notified through high-layer signaling or a mode pre-agreed in a standard. Through configuring, by the base station, the two TRS resources, apart from normal paging information, the terminal may also receive the paging information when the SI is updated or a short message such as alarm information in the case of earthquake or seaquake is transmitted by the base station. At this time, all the terminals in the cell are waken up to receive the paging information in a circumstance similar to the update of the SI or the transmission of the short message, and the base station wakes up all the terminals through transmitting the PEI on a cell-specific first TRS/CSI-RS resource, so as to prevent a code-division multiplexing operation used by the second TRS transmitted on the second TRS/CSI-RS resource, thereby to improve the performance of the paging indication corresponding to the above-mentioned message. When the two TRS/CSI-RS transmission resources are configured in the same first target time period, the terminal probably needs to perform the detection on the two resources twice. When the two TRS resources are configured by the base station in the same first target time period, e.g., a same slot, it is able for the terminal to detect the TRS/CSI-RSs of the two resources at lower power consumption.

Terminal behaviors: depending on the terminal implementation, in the first scheme, as a mode, the terminal detects the resource corresponding to the first TRS/CSI-RS at first, and when the first TRS/CSI-RS fails to be detected, the terminal detects the resource corresponding to the second TRS/CSI-RS. When the first TRS/CSI-RS has been detected on the first resource by the terminal, the terminal does not continue to detect the second TRS/CSI-RS, and instead, it wakes up the receiver to receive the paging message subsequently. When the second TRS/CSI-RS has been detected, the terminal merely wakes up the receiver to receive the corresponding paging message in accordance with the second TRS/CSI-RS. The first TRS/CSI-RS is a cell-level reference signal, so all the corresponding terminals may receive the first TRS/CSI-RS. In addition, a code-division mode is not adopted by the sequence, so the first TRS/CSI-RS has excellent performance. When the base station notifies the terminal that the SI is changed or the short message is to be received, all the terminals need to receive the paging message. At this time, the base station merely needs to transmit the first TRS to wake up all the terminals, so it is able to reduce an overhead at a base station side. The second TRS/CSI-RS is scrambled with the UE group ID, so as to differentiate the users corresponding to the PO from each other. The terminals which have detected the second TRS/CSI-RS are waken up to detect the paging signal, while the terminals which fail to detect the second TRS/CSI-RS remain in the sleep state, so as to further reduce the power consumption of the terminals. When the second TRS/CSI-RS is transmitted, the first TRS/CSI-RS is not transmitted, so the terminal may not receive the two TRS/CSI-RSs simultaneously. In addition, the terminal detects the first TRS/CSI-RS at first, and then detects the second TRS/CSI-RS when the first TRS/CSI-RS fails to be detected, so the confusion in understanding the indication from the base station may not occur. It should be noted that, alternatively, the terminal may detect the resource corresponding to the second TRS/CSI-RS before detecting the resource corresponding to the first TRS/CSI-RS, and at this time, an operating process is similar to that when the resource corresponding to the first TRS/CSI-RS is detected before detecting the resource corresponding to the second TRS/CSI-RS; that is, when the terminal has detected the second TRS/CSI-RS on the second resource, the terminal may not continue to detect the paging indication corresponding to the first TRS/CSI-RS any more. A transmission probability of the cell-level paging indication is lower than a transmission probability of the terminal group-level paging indication, so it is able to reduce the power consumption in a better manner when the group common TRS/CSI-RS corresponding to the second resource is detected at first. At this time, it is able to prevent the occurrence of the confusion in the understanding for the terminal, and reduce the overhead at the base station side. In addition, it is unnecessary for the terminal to detect the paging indications on the two resources, so it is able to reduce the power consumption for the detection. As another mode, the terminal detects the TRS/CSI-RSs on the first resource and the second resource respectively. When merely the first TRS/CSI-RS or the second TRS/CSI-RS has been detected, the terminal receives the paging message in accordance with the TRS/CSI-RS-based paging indication. When the first TRS/CSI-RS and the second TRS/CSI-RS for paging indication have been detected simultaneously on the resources corresponding to the first TRS/CSI-RS and the second TRS/CSI-RS, the terminal wakes up the receiver to receive the corresponding paging message subsequently. Unlike the PDCCH, there is no Cyclic Redundancy Check (CRC) for the sequence-based paging indication signal, so the paging indication might be detected erroneously, i.e., the paging indication may be detected on the two TRS/CSI-RS resources. At this time, even in the case of the erroneous detection, the receiver is directly waken up, so it is able to reduce a time delay for receiving the paging message.

Second Scheme: the base station transmits the first TRS/CSI-RS on the first resource and/or transmits the second TRS/CSI-RS on the second resource. The terminal detects the first TRS and the second TRS on resources corresponding to the first TRS/CSI-RS and the second TRS/CSI-RS. Different from the first scheme, apart from being scrambled with the cell ID, the first TRS is further scrambled with one of two preset sequences, i.e., a first preset sequence (e.g., an all-0 sequence $[0\,0\,0\,0\ldots0]$) and a second preset sequence (e.g., an alternate sequence $[1, 0, 1, 0, 1, 0, \ldots 1, 0, \ldots]$). When the first TRS/CSI-RS scrambled with the first preset sequence and the cell ID has been detected, the terminal wakes up the receiver to receive the paging message subsequently, and preferably, the terminal does not detect the second TRS/CSI-RS. When the first TRS/CSI-RS scrambled with the second preset sequence and the cell ID has been detected by the terminal, the terminal continues to detect the second TRS/CSI-RS scrambled with the cell ID and the UE group ID on the second resource. When the second TRS/CSI-RS has been detected on the second resource, the terminal wakes up the receiver to receive the paging message subsequently, and when the second TRS/CSI-RS fails to be detected, the terminal remains in the sleep state. When the first TRS/CSI-RS fails to be detected, the terminal does not detect the second TRS/CSI-RS. The second scheme has similar advantages as the first scheme, but as compared with the first scheme, a higher system overhead may occur in the second scheme when the first TRS/CSI-RS and the second TRS/CSI-RS are both transmitted. However, in the second scheme, the second TRS/CSI-RS is to be detected when the first TRS/CSI-RS has been detected, so it is able to reduce a false-alarm probability of the second TRS/CSI-RS. In addition, when no terminal is paged on the current PO, merely the first TRS/CSI-RS is to be detected, so it is able to reduce the power consumption. In addition, there is no CRS in the NR RRC idle mode, so the performance of the sequence-based paging indication is poor in the case of no channel estimation. When the first TRS/CSI-RS is scrambled with different scrambling sequences, the first TRS/CSI-RS is always transmitted no matter whether the paging message is transmitted. The terminal may perform the channel estimation and time/frequency offset estimation in advance on the premise that the first TRS/CSI-RS has been detected, so as to facilitate the reception of the second TRS/CSI-RS as well as the subsequent paging message.

Second Embodiment

The base station transmits a power-saving signal for the PEI before a PO or a PO group to the terminal in an RRC idle mode or an inactive mode, and the PEI corresponds to one PO or one PO group. The PEI includes a first TRS, or a first TRS/CSI-RS and a second TRS/CSI-RS. The base station transmits the first TRS/CSI-RS on the first resource, and transmits the second TRS/CSI-RS on the second resource. The first TRS/CSI-RS and the second TRS/CSI-RS are both used for paging indication. To be specific, the first TRS/CSI-RS is a UE group-specific signal, the second TRS/CSI-RS is also a UE group-specific signal; alternatively, one terminal group may merely include one terminal. Preferably, the first or second TRS/CSI-RS may be at least scrambled with the cell ID and the terminal group ID, and a scrambling method thereof has been described in the first embodiment. In addition, for the TRS/CSI-RS-based paging indication, the scrambling information further includes time information about paging, preferably information about a start OFDM symbol of the PO, and/or information about a start time of an MO corresponding to the paging indication information, e.g., a start slot and/or a start OFDM symbol of the MO. There mainly exist the following beneficial effects. No matter whether in an FR1 or an FR2, the base station may transmit the paging information through multiple beams, the MOs in each PO in each Paging Frame (PF) correspond to the paging information transmitted in different beam directions, and different MOs correspond to paging indication information transmitted through different beams. A start position of the MO depends on a first PDCCH MO in the PO configured through high-layer signaling, and a start OFDM symbol of the first MO is notified through high-layer signaling, so preferably, the paging information indication should include information about the start OFDM symbol of the PO, and/or information about the start slot of the MO and/or the start OFDM symbol of the MO. In addition, the TRS resources corresponding to the multi-beam MOs may collide with each other, so it is able to prevent the interference between the paging indications due to overlapping of the paging indications in accordance with the time information about the PO and the MO.

First Scheme: the base station merely transmits the first TRS/CSI-RS scrambled with the cell ID and the terminal group ID, and scrambled with the time information about the PO and/or MO thereof for paging indication. Preferably, the base station notifies the terminal of the maximum quantity of terminal groups supported by one transmission resource through broadcasting signaling or a pre-agreed mode in a standard, and the base station transmits the paging indication information for waking up different terminal groups on a same resource. The terminal performs joint detection on all the OFDM symbols in the first TRS. For example, when one TRS/CSI-RS occupies one slot and includes symbols 4 and 8, the TRS/CSI-RSs corresponding to the symbols 4 and 8 are serially concatenated by the terminal for joint detection. When one TRS/CSI-RS includes two slots and the TRS in each slot is located at the symbols 4 and 8, the TRS/CSI-RSs corresponding to the four symbols are serially concatenated for detection. When the TRS/CSI-RSs are concatenated for joint detection, it is able to remarkably improve the TRS detection performance.

Second Scheme: the base station transmits the first TRS/CSI-RS and the second TRS/CSI-RS each scrambled with the cell ID and the terminal group ID and scrambled with the time information about the PO and/or MO thereof for paging indication. Optionally, the scrambling information of the first TRS/CSI-RS and the second TRS/CSI-RS further includes information about an index number of the TRS/CSI-RS itself. For example, index numbers 0 and 1 of the TRS/CSI-RS are used to differentiate the first TRS from the second TRS, and they are used as a part of the scrambling information. Further, the first TRS/CSI-RS and the second TRS/CSI-RS have a same cell ID and a same UE group ID, and the base station instructs a group of UEs to receive the paging information through both the first TRS/CSI-RS and the second TRS/CSI-RS. For the reception of the terminal, preferably, the terminal performs serial concatenation on all the symbols of the first TRS/CSI-RS and the second TRS/CSI-RS in a chronological order for joint detection, so as to increase a length of a detection sequence. For example, when the first TRS/CSI-RS includes four OFDM symbols and the second TRS/CSI-RS includes six OFDM symbols, the terminal may perform serial concatenation on the ten OFDM symbols in an agreed order for joint detection, so as to improve the detection performance and reduce the probability of missed detection.

Third Embodiment

Figure 7:
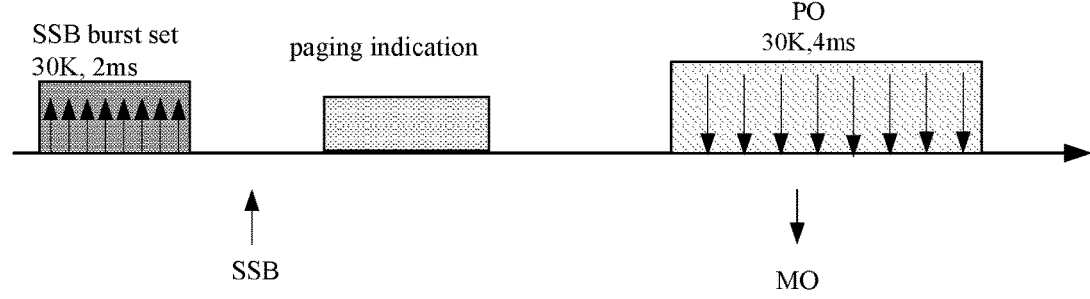
FIG. 7 is still yet another schematic view showing the transmission of the power-saving signal according to an embodiment of the present disclosure.

As mentioned in the first embodiment and the second embodiment, the base station transmits a power-saving signal for the PEI before a PO or a PO group to the terminal in an RRC idle mode or an inactive mode, and the PEI corresponds to one PO or one PO group. The PEI includes a first TRS/CSI-RS and/or a second TRS/CSI-RS. The first TRS/CSI-RS and the second TRS/CSI-RS occupy a same quantity of slots or different quantities of slots, but a time-domain length thereof is an integral multiple of the quantity of slots. For example, for an NR system, when multi-beam transmission is adopted by the base station, the base station does not know a position of the terminal, so the base station needs to transmit the paging message on each beam. As shown in FIG. 7, when a subcarrier spacing is 30K, a 2 ms SSB burst set includes eight SSBs corresponding to eight MOs within a 4 ms paging period, i.e., 8 slots, and the transmission beams for the MOs are different. Identical to a paging transmission principle, the base station transmits the corresponding paging indication on each beam.

Figure 8:
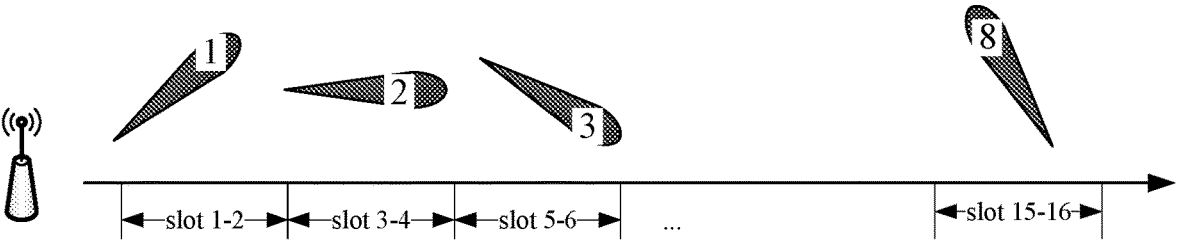
FIG. 8 is still yet another schematic view showing the transmission of the power-saving signal according to an embodiment of the present disclosure.

When the paging indication formed by the first TRS/CSI-RS and/or the second TRS/CSI-RS and transmitted on each beam occupies two slots, for the transmission of the paging indication in FIG. 7, a time-domain transmission structure in FIG. 8 is adopted for the TRS-based paging indication. However, this simple time-domain transmission structure for the paging indication occupies 16 slots, i.e., 8 ms. The following schemes are provided in this embodiment so as to further reduce the power consumption.

First Scheme: one paging indication consists of at least one pair of TRS/CSI-RSs. The patterns/resources of the at least one pair of TRS/CSI-RSs are configured in a target time unit, and the patterns/resources of a plurality of pairs of TRS/CSI-RSs in the target time unit have a same transmission beam, i.e., have a same TCI state. For the NR system, the target time unit preferably includes one slot or two slots, and for the other systems, the time unit may refer to subframe. More specifically, different transmission beams are used for different target time units. As shown in FIG. 3, the paging indication consists of the first TRS/CSI-RS and the second TRS/CSI-RS, and the first TRS/CSI-RS and the second TRS/CSI-RS are configured in the target time unit, i.e., a slot. The first TRS/CSI-RS and the second TRS/CSI-RS are transmitted through a beam 1 in a slot 1, transmitted through a beam 2 in a slot 2, and transmitted through a beam N in a slot N. As compared with the method in FIG. 8, it is able to remarkably reduce the time for transmitting the paging indication, thereby to reduce the power consumption. In addition, when the same beams are used in the target time unit, it is able to simplify the implementation at the base station side.

Second Scheme: one paging indication consists of at least one pair of TRS/CSI-RSs. The patterns/resources of the at least one pair of TRS/CSI-RSs are configured in the target time unit, and at least one paging indication is configured in the target time unit. The patterns/resources of the corresponding at least one pair of TRS/CSI-RSs are transmitted through at least one transmission beam, i.e., each paging indication is transmitted through a same transmission beam and different paging indications are transmitted through at least one transmission beam. More specifically, preferably, the paging indications or TRS/CSI-RS resources in different target time units are transmitted through different beams. To be specific, when the paging indication merely includes the first TRS/CSI-RS and the first TRS/CSI-RS merely occupies one slot, the base station may also configure in a first slot that a plurality of paging indications correspond to a plurality of TRS/CSI-RS patterns/resources. As shown in FIG. 4, the TRS resources forming one paging indication are transmitted through different beams, i.e., beams 1 and 2. In a second slot, the base station transmits the paging indication repeatedly through beams 3 and 4. In a third slot, the base station transmits the paging indication repeatedly through beams 5 and 6. In a fourth slot, the base station transmits the paging indication repeatedly through beams 7 and 8.

Third Scheme: as shown in FIG. 5, the paging indication consists of the first TRS/CSI-RS and the second TRS/CSI-RS, one paging indication is configured in one target time unit (e.g., one slot), and the corresponding two pairs of TRS/CSI-RS patterns/resources are configured in one target time unit (e.g., one slot) and correspond to one paging indication scenario. The first TRS/CSI-RS and the second TRS/CSI-RS consisting of different paging indications in each slot are transmitted through a same beam, and the pair of the first TRS/CSI-RS and the second TRS/CSI-RS corresponding to different paging indications is transmitted through different beams. The second TRS/CSI-RS and the first TRS/CSI-RS in FIG. 8 are configured on a same symbol as shown in FIG. 5, or on different symbols. As compared with a situation where only the same beam is adopted in a same target time unit, in this scheme, it is able to transmit the paging indication through remarkably fewer slots, thereby to remarkably reduce the power consumption. Usually, beam conversion is completed within a Cyclic Prefix (CP), so it is not difficult to transmit, by the base station, a plurality of beams within a same slot.

It should be appreciated that, a resource configuration of the TRS corresponding to the paging indication needs to be notified by the base station to the terminal through broadcasting signaling, e.g., SI.

Fourth Embodiment

The base station transmits a power-saving signal for the PEI to the terminal in the RRC idle mode or the inactive mode on a predetermined resource before one PO or one PO group, and the PEI corresponds to one PO or one PO group. The PEI includes a first TRS/CSI-RS and a second TRS/CSI-RS, and functions and configuration modes of the first TRS/CSI-RS and the second TRS/CSI-RS may be different. For example, the second TRS/CSI-RS is a terminal group-specific reference signal, and the first TRS/CSI-RS is a terminal-specific reference signal or a cell-specific reference signal implicitly scrambled with a cell ID. For example, the TRS/CSI-RS is a reference signal configured by the base station for a terminal in a connected state, and a scrambling code ID of the TRS/CSI-RS is configured specifically by the base station for the terminal in the connected state, and notified to the terminal in the idle mode through high-layer signaling. There exist the following implementation schemes depending on different functions of the first TRS/CSI-RS.

First Scheme: the first TRS/CSI-RS is used for a synchronization function but not used for paging indication, and the second TRS/CSI-RS supports the paging indication.

To be specific, the base station configures the first TRS/CSI-RS and the second TRS/CSI-RS for the terminal in the idle mode on a corresponding resource through high-layer signaling. The second TRS is at least scrambled with the cell ID and the terminal group ID. Optionally, the second TRS is further scrambled with time information about the PO/MO. At this time, as a terminal behavior, the terminal receives the firsts TRS/CSI-RS in accordance with the indication from the base station without any blind detection on the first TRS/CSI-RS, and the terminal performs a channel tracking operation using the first TRS/CSI-RS. The terminal detects the second TRS/CSI-RS on the corresponding resource. When the second TRS/CSI-RS has been detected or a wake-up indication of the second TRS/CSI-RS has been detected by the terminal, the terminal wakes up the receiver to receive the paging message subsequently. The complexity in the detection of the first TRS/CSI-RS is always lower than that in the synchronization operation, so the first TRS/CSI-RS may be used to assist the detection of the paging indication through the second TRS.

Second Scheme: both the first TRS/CSI-RS and the second TRS/CSI-RS support the paging indication.

To be specific, the base station configures the first TRS and the second TRS for the terminal in the idle mode on a corresponding resource through high-layer signaling. The base station scrambles the first TRS/CSI-RS with two preset sequences, i.e., a0=[0 0 0 . . . 0] and a1=[0 1 0 1 0, . . . 1 0, . . . ], and a0 is a default scrambling sequence. The first TRS/CSI-RS is scrambled, the second TRS is at least scrambled with the cell ID and the terminal group ID, and it is used to indicate the terminal group-based paging indication signal. As a terminal behavior, the terminal detects the first TRS/CSI-RS sequence scrambled with the default scrambling sequence at first, and when the first TRS/CSI-RS sequence scrambled with the default scrambling sequence fails to be detected, the terminal continues to detect the first TRS/CSI-RS sequence scrambled with the second scrambling sequence. When the first TRS/CSI-RS sequence has been detected, the terminal continues to detect the second TRS/CSI-RS sequence, and determines whether to wake up the receiver to receive the paging message in accordance with an indication on whether the second sequence or the second TRS/CSI-RS sequence has been detected. When the TRS/CSI-RS scrambled with the second scrambling sequence has been detected, the terminal stops detecting the second TRS/CSI-RS, and enters the sleep state. When the first TRS/CSI-RS scrambled with the first scrambling sequence and the second scrambling sequence fails to be detected, the terminal continues to detect the second TRS/CSI-RS sequence, and determines whether to receive the paging information subsequently on the corresponding PO in accordance with the second TRS/CSI-RS. The TRS/CSI-RS which should have been transmitted to the terminal in the connected state is actually not transmitted when data transmission has been completed for the terminal in the connected state, but the base station has already notified the terminal of a position of the TRS/CSI-RS. Before deactivating the TRS/CSI-RS transmission resource, the terminal always needs to perform the detection. At this time, terminal detects the first TRS/CSI-RS scrambled with the default scrambling sequence, i.e., the first sequence, at first, because the first TRS/CSI-RS exists with high probably. In addition, the reception of the TRS/CSI-RS by the terminal in the connected state will not be adversely affected when the first TRS/CSI-RS is scrambled with the first sequence. When no TRS/CSI-RS is actually transmitted because the data transmission for the terminal in the connected state has been completed, and there is no paging message on the corresponding PO, the base station may transmit the first TRS/CSI-RS scrambled with the second sequence. When the first TRS/CSI-RS scrambled with the second sequence has been detected, the base station notifies the terminal to detect the second TRS/CSI-RS and directly enter the sleep state.

Fifth Embodiment

The base station transmits a power-saving signal for the PEI to the terminal in the RRC idle mode or the inactive mode on a predetermined resource before one PO or one PO group, and the PEI corresponds to one PO or one PO group. The paging indication signal consists of the first power-saving signal, i.e., a TRS/CSI-RS, and the second power-saving signal, i.e., a PDCCH.

To be specific, the first power-saving signal is a cell-specific TRS/CSI-RS at least scrambled with the cell ID. The second power-saving signal is a group common PDCCH scrambled with a dedicated RNTI, e.g., PS-RNTI or PEI-RNTI. The base station scrambles the first power-saving signal, i.e., the TRS, with two preset sequences, e.g., a first scrambling sequence $a0=[0\ 0\ 0\ .\ .\ .\ 0]$ and a second scrambling sequence $a1=[0\ 1\ 0\ 1\ 0,\ .\ .\ .\ 1\ 0,\ .\ .\ .\ ]$, and the first scrambling sequence $a0$ is a default scrambling sequence. More specifically, when there is no paging message to be transmitted on the corresponding PO, the base station scrambles the first power-saving signal with the second scrambling sequence, otherwise scrambles the first power-saving signal with the first scrambling sequence. As a terminal behavior, the terminal at first detects the first power-saving signal scrambled with the default scrambling sequence. When the first power-saving signal scrambled with the default scrambling sequence fails to be detected, the terminal continues to detect the first power-saving signal scrambled with the second scrambling sequence. When the first power-saving signal has been detected, the terminal continues to detect the second power-saving signal, and determines whether to wake up the receiver to receive the paging message on the corresponding PO in accordance with whether the second power-saving signal has been detected or in accordance with the indication signaling of the second power-saving signal. When the TRS/CSI-RS scrambled with the second scrambling sequence has been detected, the terminal stops detecting the second power-saving signal, and enters the sleep state. When merely the second power-saving signal has been detected, the terminal determines whether to wake up the receiver to receive the paging message on the corresponding PO in accordance with the indication of the second power-saving signal. There is no CRS for the terminal in the RRC idle mode or inactive mode, so it is necessary to meet the requirement on the synchronization accuracy through a plurality of SSBs. When the first power-saving signal is a TRS/CSI-RS, it facilitates the terminal to perform the channel estimation and synchronization in accordance with the first power-saving signal after the terminal has detected the first power-saving signal (alternatively, the terminal performs channel estimation hypothesis testing on the first power-saving signal, and then assist the detection of the first power-saving signal), so as to facilitate the detection of the PDCCH-based power-saving signal. When there is no paging indication to be transmitted on the corresponding PO, the first power-saving signal is scrambled in different ways so as to explicitly instruct the terminal to be in the sleep state and not to receive the paging message. When the base station configures, for the terminal in the idle mode, the TRS for the terminal in the connected state, the base station may not transmit the first power-saving signal, and instead, it may wake up the terminal to receive the paging message through only the second power-saving signal, so as to reduce the system overhead.

As mentioned hereinabove, the first power-saving signal transmitted on the first resource is a TRS/CSI-RS. Different scrambling sequences are used to indicate whether there is the second power-saving signal or whether the paging message is to be received subsequently, so preferably the first power-saving signal is always transmitted by the base station not matter whether there is the paging information subsequently. In order to reduce the overhead at the base station side, optionally, when the base station indicates to the terminal that there is the TRS/CSI-RS from the terminal in the connected state (i.e., the TRS/CSI-RS transmitted by the base station to the terminal in the connected state) before the PO (e.g., within a predetermined range before the PO), the base station may deactivate the first power-saving signal resource, i.e., the base station does not transmit the first power-saving signal anymore and merely transmits the second power-saving signal. When there is no TRS/CSI-RS from the terminal in the connected state before the corresponding PO, the first resource and the second resource corresponding to the first power-saving signal and the second power-saving signal respectively are in an activated state simultaneously, and the base station may transmit the power-saving signals on the two resources. The transmission of the power-saving signal may be actually performed by the base station through an implementation method, i.e., the base station does not have to transmit the first power-saving signal. When there is the TRS/CSI-RS for the terminal in the connected state, the base station may selectively transmit, or not transmit, the first TRS/CSI-RS on the first resource.

Figure 9:
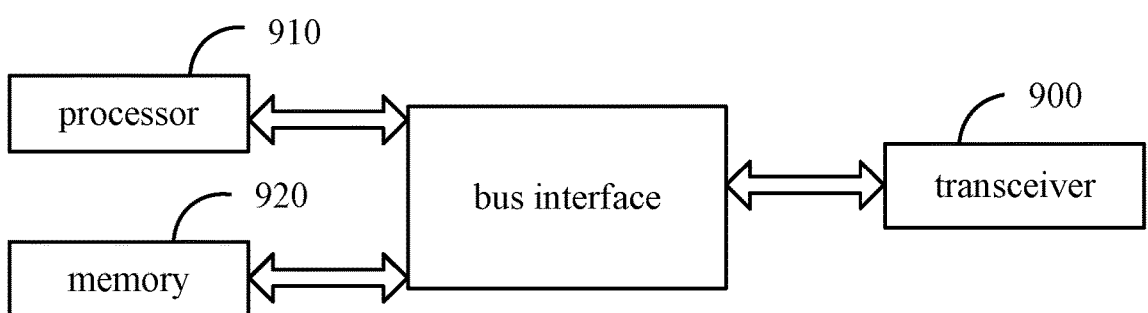
FIG. 9 is a block diagram of a network device according to an embodiment of the present disclosure.

As shown in FIG. 9, the present disclosure further provides in some embodiments a network device, which includes a memory 920, a transceiver 900 and a processor 910. The memory 920 is configured to store therein a computer program. The transceiver 900 is configured to receive and transmit data under the control of the processor 910. The processor 910 is configured to read the computer program in the memory 920, so as to transmit a PEI to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

In FIG. 9, bus architecture may include a number of buses and bridges connected to each other, so as to connect various circuits for one or more processors 910 and one or more memories 920. In addition, as is known in the art, the bus architecture may be used to connect any other circuits, such as a circuit for a peripheral device, a circuit for a voltage stabilizer and a power management circuit. A bus interface may be provided, and the transceiver 900 may consist of a plurality of elements, i.e., a transmitter and a receiver for communication with any other devices over a transmission medium. The transmission medium includes a wireless channel, a wired channel, or an optical cable. With respect to different terminals, a user interface 930 may also be provided for devices which are to be arranged inside or outside the terminal, and these devices may include but not limited to a keypad, a display, a speaker, a microphone and a joystick. The processor 910 may take charge of managing the bus architecture as well as general processings. The memory 920 may store therein data for the operation of the processor 910.

Optionally, the processor 910 may be a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor is configured to call the computer program in the memory, so as to implement the above-mentioned method in accordance with obtained executable instructions. The processor may also be physically separated from the memory.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell ID, scrambling information of the second power-saving signal includes a cell ID and a terminal group ID, and the transmitting, by the network device, the PEI to the terminal includes the network transmitting, on a first resource, the first power-saving signal, or the network device transmitting, on a second resource, the second power-saving signal; or the scrambling information of the first power-saving signal includes the cell ID and includes a first preset sequence or a second preset sequence, the scrambling information of the second power-saving signal includes the cell ID and the terminal group ID, and the transmitting, by the network device, the PEI to the terminal includes the network device transmitting, on the first resource, the first power-saving signal, and/or the network device transmitting, on the second resource, the second power-saving signal.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of an MO corresponding to the PEI.

Optionally, the transmitting, by the network device, the PEI to the terminal includes transmitting, by the network device, N PEIs to the terminal through N beams, N being an integer greater than 1.

Optionally, patterns or resources of the power-saving signals included in a first PEI in the N PEIs are configured in a same time unit and have a same TCI state, and the first PEI is any PEI in the N PEIs.

Optionally, the patterns or resources of the power-saving signals included in the N PEIs are configured in N time units respectively, and the PEIs in different time units are transmitted through different beams.

Optionally, the patterns or resources of at least one power-saving signal included in a same PEI are configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by the network device to the terminal through high-layer signaling.

Optionally, in the case that the PEI includes the first power-saving signal and the second power-saving signal, the first power-saving signal is a cell-specific power-saving signal, and the second power-saving signal is a group common PDCCH.

Optionally, in the case that a paging message is to be transmitted on the PO, the scrambling information of the first power-saving signal includes a fifth preset sequence, and in the case that no paging message is to be transmitted on the PO, the scrambling information of the first power-saving signal includes a sixth preset sequence.

Optionally, the transmitting the PEI to the terminal includes: in the case that there is a power-saving signal for a terminal in a connected state before the PO, deactivating, by the network device, a first resource for the first power-saving signal, and transmitting the second power-saving signal to the terminal on a second resource; or in the case that there is no power-saving signal for the terminal in the connected state before the PO, the network device transmitting, on the first resource, the first power-saving signal to the terminal, and the network device transmitting, on the second resource, the second power-saving signal to the terminal.

Optionally, the first power-saving signal includes one of a TRS or a CSI-RS; and/or the second power-saving signal includes one of a TRS or a CSI-RS.

It should be appreciated that, the network device in the embodiments of the present disclosure is used to implement all the steps of the above-mentioned method with a same technical effect, which will not be repeatedly defined herein.

Figure 10:
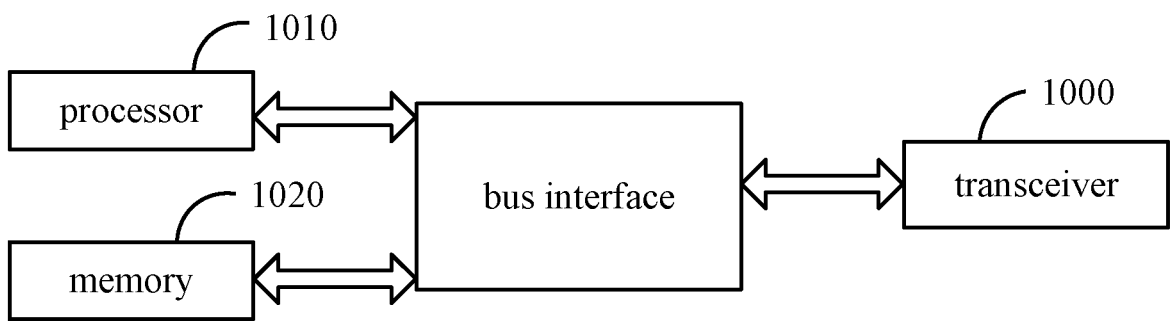
FIG. 10 is a block diagram of a terminal according to an embodiment of the present disclosure.

As shown in FIG. 10, the present disclosure further provides in some embodiments a terminal which includes a memory 1020, a transceiver 1000 and a processor 1010. The memory 1020 is configured to store therein a computer program. The transceiver 1000 is configured to receive and transmit data under the control of the processor 1010. The processor 1010 is configured to read the computer program in the memory 1020, so as to: detect a PEI transmitted by a network device, the terminal being in an idle mode or an inactive mode, the PEI including at least one of a first power-saving signal or a second power-saving signal; and determine whether paging information is to be detected on PO in accordance with the detected PEI. The PEI is transmitted before the PO, and the PO includes at least one PO or at least one PO group.

In FIG. 10, bus architecture may include a number of buses and bridges connected to each other, so as to connect various circuits for one or more processors 1010 and one or more memories 1020. In addition, as is known in the art, the bus architecture may be used to connect any other circuits, such as a circuit for a peripheral device, a circuit for a voltage stabilizer and a power management circuit. A bus interface may be provided, and the transceiver 1000 may consist of a plurality of elements, i.e., a transmitter and a receiver for communication with any other devices over a transmission medium. The transmission medium includes a wireless channel, a wired channel, or an optical cable. With respect to different terminals, a user interface 1030 may also be provided for devices which are to be arranged inside or outside the terminal, and these devices may include but not limited to a keypad, a display, a speaker, a microphone and a joystick. The processor 1010 may take charge of managing the bus architecture as well as general processings. The memory 1020 may store therein data for the operation of the processor 1010.

Optionally, the processor 1010 may be a CPU, an ASIC, an FPGA or a CPLD. The processor may also use multi-core architecture.

The processor is configured to call the computer program in the memory, so as to implement the above-mentioned method in accordance with obtained executable instructions. The processor may also be physically separated from the memory.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell ID, scrambling information of the second power-saving signal includes a cell ID and a terminal group ID, and the detecting, by the terminal, the PEI transmitted by the network device includes: detecting, by the terminal, the first power-saving signal on a first resource or detecting the second power-saving signal on a second resource, or detecting, by the terminal, the first power-saving signal and the second power-saving signal on the first resource and the second resource respectively; or the scrambling information of the first power-saving signal includes the cell ID and includes a first preset sequence or a second preset sequence, the scrambling information of the second power-saving signal includes the cell ID and the terminal group ID, and the detecting, by the terminal, the PEI transmitted by the network device includes detecting the first power-saving signal on the first resource, and in the case that the second preset sequence and the first power-saving signal scrambled with the cell ID are detected on the first resource, detecting, by the terminal, the second power-saving signal on the second resource. In the case that the first preset sequence and the first power-saving signal scrambled with the cell ID have been detected on the first resource, the terminal determines whether the paging information is to be detected on the PO in accordance with the first power-saving signal and does not detect the second power-saving signal. In the case that the second power-saving signal has been detected on the second resource, the terminal determines whether the paging information is to be detected on the PO in accordance with the second power-saving signal, and in the case that the second power-saving signal fails to be detected on the second resource, the terminal enters a sleep state.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of an MO corresponding to the PEI.

Optionally, patterns or resources of the power-saving signals included in the PEI are configured in a same time unit and have a same TCI state.

Optionally, the pattern or resource of at least one power-saving signal included in the PEI is configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by a network device to the terminal through high-layer signaling.

Optionally, in the case that the first power-saving signal is used for the synchronization and the second power-saving signal is used for the paging indication, the detecting the PEI transmitted by the network device includes: receiving the first power-saving signal in accordance with an indication from the network device, and performing a channel tracking operation in accordance with the first power-saving signal; detecting the second power-saving signal; and in the case that the second power-saving signal is detected by the terminal, determining whether the paging information is to be detected on the PO in accordance with the second power-saving signal.

Optionally, in the case that the first power-saving signal supports paging indication and the second power-saving signal supports paging indication, the detecting the PEI transmitted by the network device includes: detecting the first power-saving signal scrambled with a third scrambling sequence; in the case that the first power-saving signal scrambled with the third scrambling sequence fails to be detected, detecting the first power-saving signal scrambled with a fourth scrambling sequence; and in the case that the first power-saving signal scrambled with the third scrambling sequence has been detected or the first power-saving signal scrambled with the third scrambling sequence and the first power-saving signal scrambled with the fourth scrambling sequence fail to be detected, detecting the second power-saving signal. In the case that the first power-saving signal scrambled with the fourth scrambling sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, in the case that the PEI includes the first power-saving signal and the second power-saving signal, the first power-saving signal is a cell-specific power-saving signal and the second power-saving signal is a group common PDDCH.

Optionally, the detecting the PEI transmitted by the network device includes: detecting the first power-saving signal scrambled with a fifth preset sequence; in the case that the first power-saving signal scrambled with the fifth preset sequence fails to be detected, detecting the first power-saving signal scrambled with a sixth preset sequence; and in the case that the first power-saving signal scrambled with the fifth preset sequence has been detected or the first power-saving signal scrambled with the fifth preset sequence and the first power-saving signal scrambled with the sixth preset sequence fail to be detected, detecting the second power-saving signal. In the case that the first power-saving signal scrambled with the sixth preset sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, the first power-saving signal includes one of a TRS or a CSI-RS, and/or the second power-saving signal includes one of a TRS or a CSI-RS.

It should be appreciated that, the terminal in the embodiments of the present disclosure is used to implement all the steps of the above-mentioned method with a same technical effect, which will not be repeatedly defined herein.

Figure 11:
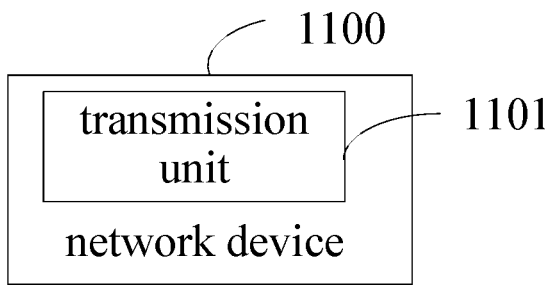
FIG. 11 is another block diagram of the network device according to an embodiment of the present disclosure.

As shown in FIG. 11, the present disclosure further provides in some embodiments a network device 1100 which includes a transmission unit 1101 configured to transmit a PEI to a terminal in an idle mode or an inactive mode. The PEI includes at least one of a first power-saving signal or a second power-saving signal, the PEI is used to indicate whether the terminal is to detect paging information on PO, the PEI is transmitted before the PO, and the PO includes at least one PO or at least one PO group.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell ID, scrambling information of the second power-saving signal includes a cell ID and a terminal group ID, and the transmission unit is further configured to transmit the first power-saving signal on a first resource or transmit the second power-saving signal on a second resource; or the scrambling information of the first power-saving signal includes the cell ID and includes a first preset sequence or a second preset sequence, the scrambling information of the second power-saving signal includes the cell ID and the terminal group ID, and the transmission unit is further configured to transmit the first power-saving signal on the first resource and/or transmitting the second power-saving signal on the second resource.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of an MO corresponding to the PEI.

Optionally, the transmission unit is further configured to transmit N PEIs to the terminal through N beams, N being an integer greater than 1.

Optionally, patterns or resources of the power-saving signals included in a first PEI in the N PEIs are configured in a same time unit and have a same TCI state, and the first PEI is any PEI in the N PEIs.

Optionally, the patterns or resources of the power-saving signals included in the N PEIs are configured in N time units respectively, and the PEIs in different time units are transmitted through different beams.

Optionally, the patterns or resources of at least one power-saving signal included in a same PEI are configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by the network device to the terminal through high-layer signaling.

Optionally, in the case that the PEI includes the first power-saving signal and the second power-saving signal, the first power-saving signal is a cell-specific power-saving signal, and the second power-saving signal is a group common PDCCH.

Optionally, in the case that a paging message is to be transmitted on the PO, the scrambling information of the first power-saving signal includes a fifth preset sequence, and in the case that no paging message is to be transmitted on the PO, the scrambling information of the first power-saving signal includes a sixth preset sequence.

Optionally, the transmission unit is further configured to: in the case that there is a power-saving signal for a terminal in a connected state before the PO, deactivate a first resource for the first power-saving signal, and transmit the second power-saving signal to the terminal on a second resource; or in the case that there is no power-saving signal for the terminal in the connected state before the PO, transmit the first power-saving signal on the first resource, and transmit the second power-saving signal on the second resource.

Optionally, the first power-saving signal includes one of a TRS or a CSI-RS; and/or the second power-saving signal includes one of a TRS or a CSI-RS.

It should be appreciated that, the network device in the embodiments of the present disclosure is used to implement all the steps of the above-mentioned method with a same technical effect, which will not be repeatedly defined herein.

Figure 12:
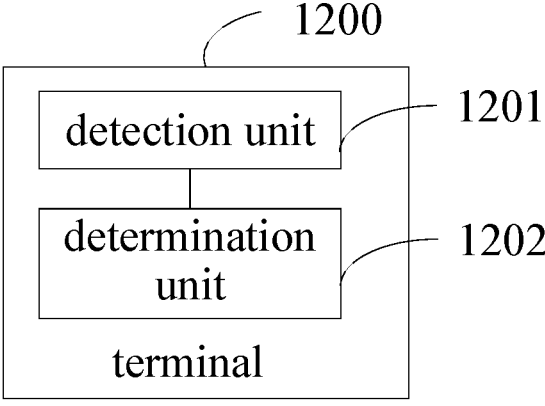
FIG. 12 is another block diagram of the terminal according to an embodiment of the present disclosure.

As shown in FIG. 12, the present disclosure further provides in some embodiments a terminal 1200 which includes: a detection unit 1201 configured to detect a PEI transmitted by a network device, the terminal being in an idle mode or an inactive mode, the PEI including at least one of a first power-saving signal or a second power-saving signal; and a determination unit 1202 configured to determine whether paging information is to be detected on PO in accordance with the detected PEI. The PEI is transmitted before the PO, and the PO includes at least one PO or at least one PO group.

Optionally, the first power-saving signal is used for paging indication, and the first power-saving signal is a cell-specific power-saving signal. The second power-saving signal is used for paging indication, and the second power-saving signal is a terminal group-specific power-saving signal.

Optionally, scrambling information of the first power-saving signal includes a cell ID, scrambling information of the second power-saving signal includes a cell ID and a terminal group ID, and the detection unit is further configured to: detect the first power-saving signal on a first resource or detect the second power-saving signal on a second resource, or detect the first power-saving signal and the second power-saving signal on the first resource and the second resource respectively; or the scrambling information of the first power-saving signal includes the cell ID and includes a first preset sequence or a second preset sequence, the scrambling information of the second power-saving signal includes the cell ID and the terminal group ID, and the detection unit is further configured to detect the first power-saving signal on the first resource, and in the case that the second preset sequence and the first power-saving signal scrambled with the cell ID are detected on the first resource, detect the second power-saving signal on the second resource. In the case that the first preset sequence and the first power-saving signal scrambled with the cell ID have been detected on the first resource, the terminal determines whether the paging information is to be detected on the PO in accordance with the first power-saving signal and does not detect the second power-saving signal. In the case that the second power-saving signal has been detected on the second resource, the terminal determines whether the paging information is to be detected on the PO in accordance with the second power-saving signal, and in the case that the second power-saving signal fails to be detected on the second resource, the terminal enters a sleep state.

Optionally, the first resource and the second resource are within a same time unit.

Optionally, the first power-saving signal is used for paging indication and the first power-saving signal is a terminal group-specific power-saving signal; and/or the second power-saving signal is used for paging indication and the second power-saving signal is a terminal group-specific power-saving signal.

Optionally, scrambling information of the first power-saving signal includes a cell ID and a terminal group ID, and/or scrambling information of the second power-saving signal includes a cell ID and a terminal group ID.

Optionally, the scrambling information of the first power-saving signal further includes at least one of time information about paging or index information about the first power-saving signal, and/or the scrambling information of the second power-saving signal further includes at least one of time information about paging and index information about the second power-saving signal.

Optionally, the time information about the paging includes at least one of information about a start symbol of the PO, or information about a start time of an MO corresponding to the PEI.

Optionally, patterns or resources of the power-saving signals included in the PEI are configured in a same time unit and have a same TCI state.

Optionally, the pattern or resource of at least one power-saving signal included in the PEI is configured in a same time unit, and the power-saving signals included in different PEIs are configured in different time units.

Optionally, the patterns or resources of the power-saving signals included in at least one PEI are configured in one time unit, the power-saving signals included in different PEIs in the one time unit are transmitted through different beams, and the power-saving signals included in a same PEI are transmitted through a same beam.

Optionally, the first power-saving signal and the second power-saving signal included in a same PEI in the one time unit are configured in a same time sub-unit, or different time sub-units, of the one time unit.

Optionally, the first power-saving signal is used for synchronization, the second power-saving signal is used for paging indication, and scrambling information of the second power-saving signal includes a cell ID and a terminal group ID; and/or the first power-saving signal supports paging indication, the second power-saving signal supports paging indication, scrambling information of the first power-saving signal includes a third preset sequence or a fourth preset sequence, and the scrambling information of the second power-saving signal includes a cell ID and a terminal group ID.

Optionally, in the case that the first power-saving signal is used for the synchronization and the second power-saving signal is used for the paging indication, the first power-saving signal includes a reference signal, wherein the reference signal is configured for a terminal in a connected state and transmitted to the terminal in the idle mode or the inactive mode; and/or the scrambling information of the first power-saving signal is notified by a network device to the terminal through high-layer signaling.

Optionally, in the case that the first power-saving signal is used for the synchronization and the second power-saving signal is used for the paging indication, the detection unit is further configured to: receive the first power-saving signal in accordance with an indication from the network device, and perform a channel tracking operation in accordance with the first power-saving signal; detect the second power-saving signal; and in the case that the second power-saving signal is detected by the terminal, determine whether the paging information is to be detected on the PO in accordance with the second power-saving signal.

Optionally, in the case that the first power-saving signal supports paging indication and the second power-saving signal supports paging indication, the detection unit is further configured to: detect the first power-saving signal scrambled with a third scrambling sequence; in the case that the first power-saving signal scrambled with the third scrambling sequence fails to be detected, detect the first power-saving signal scrambled with a fourth scrambling sequence; and in the case that the first power-saving signal scrambled with the third scrambling sequence has been detected or the first power-saving signal scrambled with the third scrambling sequence and the first power-saving signal scrambled with the fourth scrambling sequence fail to be detected, detect the second power-saving signal. In the case that the first power-saving signal scrambled with the fourth scrambling sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, in the case that the PEI includes the first power-saving signal and the second power-saving signal, the first power-saving signal is a cell-specific power-saving signal and the second power-saving signal is a group common PDDCH.

Optionally, the detection unit is further configured to: detect the first power-saving signal scrambled with a fifth preset sequence; in the case that the first power-saving signal scrambled with the fifth preset sequence fails to be detected, detect the first power-saving signal scrambled with a sixth preset sequence; and in the case that the first power-saving signal scrambled with the fifth preset sequence has been detected or the first power-saving signal scrambled with the fifth preset sequence and the first power-saving signal scrambled with the sixth preset sequence fail to be detected, detect the second power-saving signal. In the case that the first power-saving signal scrambled with the sixth preset sequence has been detected, the terminal does not detect the second power-saving signal and enters a sleep state. In the case that the second power-saving signal is detected by the terminal, the terminal determines whether the paging information is to be detected on the PO in accordance with the second power-saving signal.

Optionally, the first power-saving signal includes one of a TRS or a CSI-RS, and/or the second power-saving signal includes one of a TRS or a CSI-RS.

It should be appreciated that, the terminal in the embodiments of the present disclosure is used to implement all the steps of the above-mentioned method with a same technical effect, which will not be repeatedly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The present disclosure further provides in some embodiments a processor-readable storage medium storing therein a computer program. The computer program is executed by a processor so as to implement the above-mentioned signal transmission method at a network device side or the above-mentioned signal transmission method at a terminal side.

The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to a disk memory and an optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art can make various changes and modifications to the application without departing from the spirit and scope of the application. In this way, if these changes and modifications of the present application fall within the scope of the claims of the present application and their equivalences, the present application is also intended to include these changes and modifications

What is claimed is:

1. A signal transmission method, comprising:

transmitting, by a network device, a Paging Early Indication (PEI) to a terminal, wherein the terminal is in an idle mode or an inactive mode, the PEI comprises at least one of a first power-saving signal or a second power-saving signal, wherein the PEI is used to indicate whether the terminal is to detect paging information on a Paging Occasion (PO), the PEI is transmitted before the PO, and the PO comprises at least one PO or at least one PO group, wherein scrambling information of the first power-saving signal comprises a cell Identity (ID), scrambling information of the second power-saving signal comprises a cell ID and a terminal group ID, and the transmitting, by the network device, the PEI to the terminal comprises: the network transmitting, on a first resource, the first power-saving signal, or the network device transmitting, on a second resource, the second power-saving signal; or the scrambling information of the first power-saving signal comprises the cell ID and comprises a first preset sequence or a second preset sequence, the scrambling information of the second power-saving signal comprises the cell ID and the terminal group ID, and the transmitting, by the network device, the PEI to the terminal comprises: the network device transmitting, on the first resource, the first power-saving signal, and/or the network device transmitting, on the second resource, the second power-saving signal, wherein in the case that the first preset sequence and the first power-saving signal scrambled with the cell ID are transmitted by the network device on the first resource, the first preset sequence and the first power-saving signal scrambled with the cell ID are detected by the terminal on the first resource and the terminal determines whether the paging information is to be detected on the PO in accordance with the first power-saving signal and does not detect the second power-saving signal, wherein in the case that the second power-saving signal is transmitted by the network device on the second resource, the second power-saving signal is detected by the terminal on the second resource and the terminal determines whether the paging information is to be detected on the PO in accordance with the second power-saving signal, and in the case that the second power-saving signal fails to be detected by the terminal on the second resource, the terminal enters a sleep state.

2. A network device, comprising a memory, a transceiver and a processor, wherein the memory is configured to store therein a computer program, the transceiver is configured to receive and transmit data under the control of the processor, the processor is configured to read the computer program in the memory to implement the signal transmission method according to claim 1.

3. A signal transmission method, comprising:

detecting, by a terminal, a PEI transmitted by a network device, the terminal being in an idle mode or an inactive mode, the PEI comprising at least one of a first power-saving signal or a second power-saving signal;

determining, by the terminal in accordance with the detected PEI, whether paging information is to be detected on a PO, wherein the PEI is transmitted before the PO, and the PO comprises at least one PO or at least one PO group, wherein scrambling information of the first power-saving signal comprises a cell ID, scrambling information of the second power-saving signal comprises a cell ID and a terminal group ID, and the detecting, by the terminal, the PEI transmitted by the network device comprises: the terminal detecting, on a first resource, the first power-saving signal, or detecting, on a second resource, the second power-saving signal; or the terminal detecting, on the first resource and the second resource, the first power-saving signal and the second power-saving signal respectively; or the scrambling information of the first power-saving signal comprises the cell ID and comprises a first preset sequence or a second preset sequence, the scrambling information of the second power-saving signal comprises the cell ID and the terminal group ID, and the detecting, by the terminal, the PEI transmitted by the network device comprises: the terminal detecting, on the first resource, the first power-saving signal; in the case that the second preset sequence and the first power-saving signal scrambled with the cell ID are detected by the terminal on the first resource, the terminal detecting, on the second resource, the second power-saving signal, wherein in the case that the first preset sequence and the first power-saving signal scrambled with the cell ID are detected by the terminal on the first resource, the terminal determines whether the paging information is to be detected on the PO in accordance with the first power-saving signal and does not detect the second power-saving signal, wherein in the case that the second power-saving signal is detected by the terminal on the second resource, the terminal determines whether the paging information is to be detected on the PO in accordance with the second power-saving signal, and in the case that the second power-saving signal fails to be detected by the terminal on the second resource, the terminal enters a sleep state.

4. The signal transmission method according to claim 3, wherein the first power-saving signal is used for paging indication, and the first power-saving signal is a cell-specific power-saving signal;

the second power-saving signal is used for paging indication, and the second power-saving signal is a terminal group-specific power-saving signal.

5. The signal transmission method according to claim 4, wherein the first resource and the second resource are within a same time unit.

6. The signal transmission method according to claim 3, wherein the first power-saving signal is used for paging indication and the first power-saving signal is a terminal group-specific power-saving signal; and/or the second power-saving signal is used for paging indication and the second power-saving signal is a terminal group-specific power-saving signal.

7. The signal transmission method according to claim 6, wherein scrambling information of the first power-saving signal comprises a cell ID and a terminal group ID; and/or scrambling information of the second power-saving signal comprises a cell ID and a terminal group ID.

8. The signal transmission method according to claim 7, wherein the scrambling information of the first power-saving signal further comprises at least one of time information about paging or index information about the first power-saving signal; and/or the scrambling information of the second power-saving signal further comprises at least one of time information about paging or index information about the second power-saving signal.

9. The signal transmission method according to claim 8, wherein the time information about the paging comprises at least one of:

information about a start symbol of the PO, or information about a start time of an MO corresponding to the PEI.

10. The signal transmission method according to claim 3, wherein patterns or resources of the power-saving signals comprised in the PEI are configured in a same time unit, and the patterns or resources of the power-saving signals comprised in the PEI have a same TCI state.

11. The signal transmission method according to claim 10, wherein the pattern or resource of at least one power-saving signal comprised in the PEI is configured in the same time unit, and the power-saving signals comprised in different PEIs are configured in different time units.

12. The signal transmission method according to claim 10, wherein the patterns or resources of the power-saving signals comprised in at least one PEI are configured in one time unit, the power-saving signals comprised in different PEIs in the one time unit are transmitted through different beams, and the power-saving signals comprised in a same PEI are transmitted through a same beam.

13. The signal transmission method according to claim 12, wherein the first power-saving signal and the second power-saving signal comprised in a same PEI in the one time unit are configured in a same time sub-unit, or different time sub-units, of the one time unit.

14. The signal transmission method according to claim 3, wherein the first power-saving signal is used for synchronization, the second power-saving signal is used for paging indication, and scrambling information of the second power-saving signal comprises a cell ID and a terminal group ID; or the first power-saving signal supports paging indication, the second power-saving signal supports paging indication, scrambling information of the first power-saving signal comprises a third preset sequence or a fourth preset sequence, and the scrambling information of the second power-saving signal comprises a cell ID and a terminal group ID.

15. The signal transmission method according to claim 14, wherein in the case that the first power-saving signal is used for the synchronization and the second power-saving signal is used for the paging indication, the first power-saving signal comprises a reference signal, wherein the reference signal is configured for a terminal in a connected state and transmitted to the terminal in the idle mode or the inactive mode; and/or the scrambling information of the first power-saving signal is notified by the network device to the terminal through high-layer signaling.

16. The signal transmission method according to claim 15, wherein in the case that the first power-saving signal is used for the synchronization and the second power-saving signal is used for the paging indication, the detecting, by the terminal, the PEI transmitted by the network device comprises:

receiving, by the terminal, the first power-saving signal in accordance with an indication from the network device, and performing a channel tracking operation in accordance with the first power-saving signal;

detecting, by the terminal, the second power-saving signal;

in the case that the second power-saving signal is detected by the terminal, determining, by the terminal, whether the paging information is to be detected on the PO in accordance with the second power-saving signal.

17. The signal transmission method according to claim 14, wherein in the case that the first power-saving signal supports paging indication and the second power-saving signal supports paging indication;

the detecting, by the terminal, the PEI transmitted by the network device comprises:

detecting, by the terminal, the first power-saving signal scrambled with a third scrambling sequence;

in the case that the first power-saving signal scrambled with the third scrambling sequence fails to be detected by the terminal, detecting, by the terminal, the first power-saving signal scrambled with a fourth scrambling sequence;

in the case that the first power-saving signal scrambled with the third scrambling sequence is detected by the terminal, or the first power-saving signal scrambled with the third scrambling sequence and the first power-saving signal scrambled with the fourth scrambling sequence fail to be detected by the terminal, detecting, by the terminal, the second power-saving signal, wherein in the case that the first power-saving signal scrambled with the fourth scrambling sequence is detected by the terminal, the terminal does not detect the second power-saving signal and enters a sleep state, wherein in the case that the second power-saving signal is detected by the terminal, the terminal determines whether the paging information is to be detected on the PO in accordance with the second power-saving signal.

18. The signal transmission method according to claim 3, wherein in the case that the PEI comprises the first power-saving signal and the second power-saving signal, the first power-saving signal is a cell-specific power-saving signal and the second power-saving signal is a group common PDDCH.

19. A terminal, comprising a memory, a transceiver and a processor, wherein the memory is configured to store therein a computer program, the transceiver is configured to receive and transmit data under the control of the processor, the processor is configured to read the computer program in the memory to:

detect a PEI transmitted by a network device, the terminal being in an idle mode or an inactive mode, the PEI comprising at least one of a first power-saving signal or a second power-saving signal;

determine whether paging information is to be detected on PO in accordance with the detected PEI, wherein the PEI is transmitted before the PO, and the PO comprises at least one PO or at least one PO group, wherein scrambling information of the first power-saving signal comprises a cell ID, scrambling information of the second power-saving signal comprises a cell ID and a terminal group ID, and the detecting, by the terminal, the PEI transmitted by the network device comprises: the terminal detecting, on a first resource, the first power-saving signal, or detecting, on a second resource, the second power-saving signal; or the terminal detecting, on the first resource and the second resource, the first power-saving signal and the second power-saving signal respectively; or the scrambling information of the first power-saving signal comprises the cell ID and comprises a first preset sequence or a second preset sequence, the scrambling information of the second power-saving signal comprises the cell ID and the terminal group ID, and the detecting, by the terminal, the PEI transmitted by the network device comprises: the terminal detecting, on the first resource, the first power-saving signal; in the case that the second preset sequence and the first power-saving signal scrambled with the cell ID are detected by the terminal on the first resource, the terminal detecting, on the second resource, the second power-saving signal, wherein in the case that the first preset sequence and the first power-saving signal scrambled with the cell ID are detected by the terminal on the first resource, the terminal determines whether the paging information is to be detected on the PO in accordance with the first power-saving signal and does not detect the second power-saving signal, wherein in the case that the second power-saving signal is detected by the terminal on the second resource, the terminal determines whether the paging information is to be detected on the PO in accordance with the second power-saving signal, and in the case that the second power-saving signal fails to be detected by the terminal on the second resource, the terminal enters a sleep state.

* * * * *